United States Patent
Teraoka et al.

(10) Patent No.: US 11,467,818 B2
(45) Date of Patent: Oct. 11, 2022

(54) SOFTWARE UPDATE DEVICE, SOFTWARE UPDATE METHOD, AND SOFTWARE UPDATE SYSTEM

(71) Applicant: Hitachi Automotive Systems, Ltd., Hitachinaka (JP)

(72) Inventors: Hidetoshi Teraoka, Tokyo (JP); Kohei Sakurai, Hitachinaka (JP); Kenichi Osada, Hitachinaka (JP); Kenichi Kurosawa, Hitachinaka (JP); Fumiharu Nakahara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/341,091

(22) PCT Filed: Sep. 8, 2017

(86) PCT No.: PCT/JP2017/032506
§ 371 (c)(1),
(2) Date: Apr. 11, 2019

(87) PCT Pub. No.: WO2018/070156
PCT Pub. Date: Apr. 19, 2018

(65) Prior Publication Data
US 2020/0225930 A1    Jul. 16, 2020

(30) Foreign Application Priority Data

Oct. 14, 2016  (JP) .............................. JP2016-202767

(51) Int. Cl.
*G06F 9/44*        (2018.01)
*G06F 8/65*        (2018.01)
(Continued)

(52) U.S. Cl.
CPC .............. *G06F 8/65* (2013.01); *B60L 3/0061* (2013.01); *B60L 3/0076* (2013.01); *B60L 3/12* (2013.01); *B60L 2270/40* (2013.01)

(58) Field of Classification Search
None
See application file for complete search history.

(56) References Cited

U.S. PATENT DOCUMENTS 6,836,657 B2 * 12/2004 Ji ........................ G06F 11/1433
                                                455/419
8,655,541 B2    2/2014 You
(Continued)

FOREIGN PATENT DOCUMENTS

JP    2000-315157 A    11/2000
JP    2003-337723 A    11/2003
(Continued)

OTHER PUBLICATIONS

International Search Report (PCT/ISA/210) issued in PCT Application No. PCT/JP2017/032506 dated Oct. 31, 2017 with English translation (five pages).

(Continued)

*Primary Examiner* — Wei Y Zhen
*Assistant Examiner* — Lanny N Ung
(74) *Attorney, Agent, or Firm* — Crowell & Moring LLP

(57) ABSTRACT

A software update device is connected to a control device and includes an update control unit executing an update process of causing software for the control device to transit from a non-updated state to a completely updated state, a recovery control information managing unit acquiring recovery control information, and a recovery control unit executing a recovery process of causing the software to transit to the completely updated state on a basis of the recovery control information in a case where an abnormality (Continued)

in the update process has prevented the software from transiting to the completely updated state.

17 Claims, 30 Drawing Sheets

(51) Int. Cl.
  *B60L 3/00*   (2019.01)
  *B60L 3/12*   (2006.01)

(56) References Cited

U.S. PATENT DOCUMENTS

| | | | |
|---|---|---|---|
| 9,524,160 B2* | 12/2016 | Takahashi | G06F 13/00 |
| 2004/0261073 A1* | 12/2004 | Herle | G06F 8/65 |
| | | | 717/173 |
| 2005/0210459 A1 | 9/2005 | Henderson et al. | |
| 2006/0259207 A1 | 11/2006 | Natsume | |
| 2008/0270677 A1* | 10/2008 | Kolakowski | G06F 8/60 |
| | | | 711/103 |
| 2009/0290553 A1 | 11/2009 | Matsukura et al. | |
| 2010/0306447 A1* | 12/2010 | Lin | G06F 12/0246 |
| | | | 711/103 |
| 2011/0131563 A1* | 6/2011 | Ohama | G06F 8/65 |
| | | | 717/168 |
| 2011/0185052 A1 | 7/2011 | Nakahira | |
| 2011/0307879 A1* | 12/2011 | Ishida | G06F 11/1433 |
| | | | 717/170 |
| 2012/0124419 A1 | 5/2012 | Matthew | |
| 2013/0283091 A1* | 10/2013 | Quin | G06F 8/63 |
| | | | 714/3 |
| 2014/0282470 A1 | 9/2014 | Buga et al. | |
| 2015/0007155 A1* | 1/2015 | Hoffman | G06F 8/65 |
| | | | 717/168 |

FOREIGN PATENT DOCUMENTS

| | | |
|---|---|---|
| JP | 2004-48340 A | 2/2004 |
| JP | 2005-349878 A | 12/2005 |
| JP | 2010-170304 A | 8/2010 |
| JP | 2010-198155 A | 9/2010 |
| JP | 4548601 B2 | 9/2010 |
| JP | 2011-155600 A | 8/2011 |
| JP | 4901955 B2 | 3/2012 |
| JP | 2013-156216 A | 8/2013 |
| JP | 2013-543200 A | 11/2013 |
| JP | 2015-121987 A | 7/2015 |
| JP | 2016-170740 A | 9/2016 |
| WO | WO 2010/098019 A2 | 9/2010 |

OTHER PUBLICATIONS

Japanese-language Written Opinion (PCT/ISA/237) issued in PCT Application No. PCT/JP2017/032506 dated Oct. 31, 2017 (four pages).
Extended European Search Report issued in European Application No. 17860883.2 dated May 8, 2020 (14 pages).
Nakanishi T. et al: "A Software Update Scheme by Airwaves for Automotive Equipment", Informatics, Electronics & Vision (ICIEV), May 17, 2013, pp. 1-6, 2013 International Conference on, IEEE, XP032445589 (six (6) pages).
Japanese-language Office Action issued in Japanese Application No. 2020-148013 dated Nov. 9, 2021 with English translation (seven (7) pages).
European Communication pursuant to Article 94(3) EPC issued in European Application No. 17 860 883.2 dated Dec. 10, 2021 (six (6) pages).
Japanese-language Office Action issued in Japanese Application No. 2020-148013 dated Jul. 12, 2022 with English translation (10 pages).

* cited by examiner

FIG.3

| ECU ID | UPDATE START STATE | BLOCK BEING PROCESSED | COMPLETED COMMAND | SUCCESSFULLY PROCESSED BLOCK | |
|---|---|---|---|---|---|
| SELF-DRIVING ECU | ALREADY STARTED | Block n-1 | DATA TRANSFER START REQUEST | Block n | D11 |
| ENGINE CONTROL ECU | NOT STARTED YET | — | — | — | D12 |

| | | |
|---|---|---|
| ECU ID | SELF-DRIVING ECU | 50211a |
| START TIMING | TRAVELING START | 50212a |
| DISPLAY CONTENT | ATTENTION CALLING | 50213a |
| RECOVERY METHOD | DIFFERENTIAL RESUME | 50214a |
| RECOVERY DATA URI | NULL | 50215a |

5021a

[ATTENTION]
ECU SOFTWARE UPDATE HAS BEEN ABORTED.

NEW FUNCTIONS ARE NOT AVAILABLE YET.

UPDATE IS AUTOMATICALLY APPLIED.

G10a

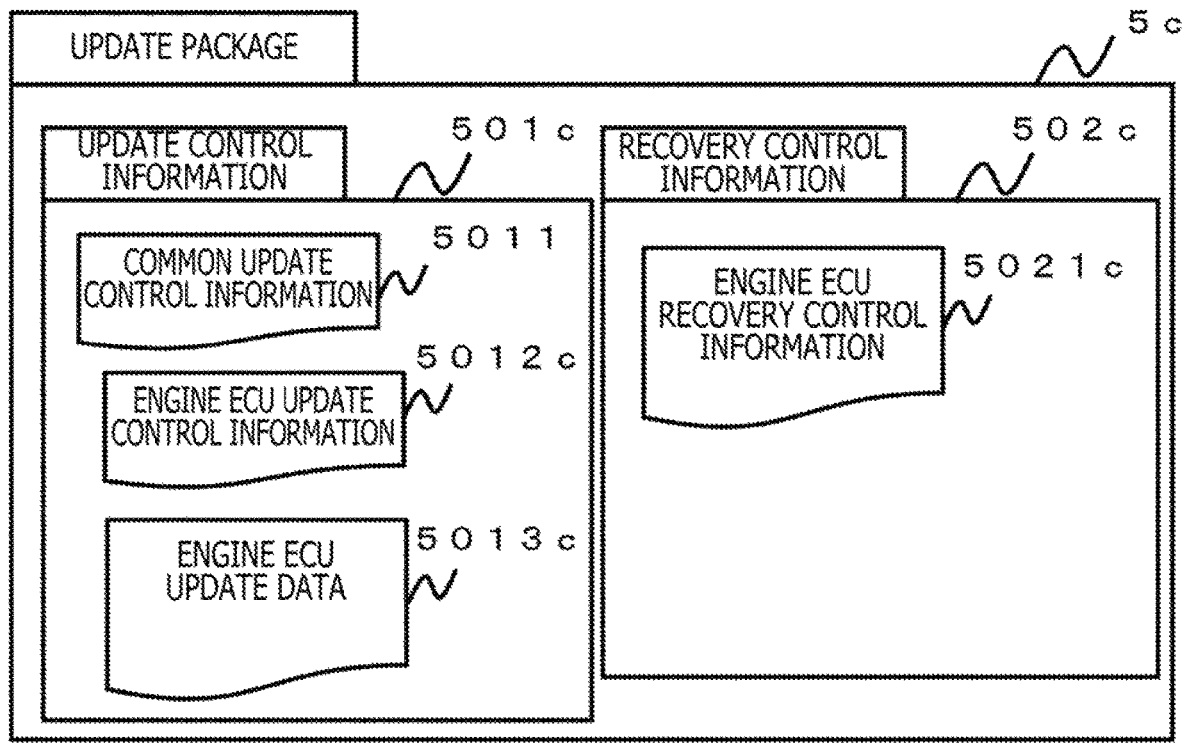

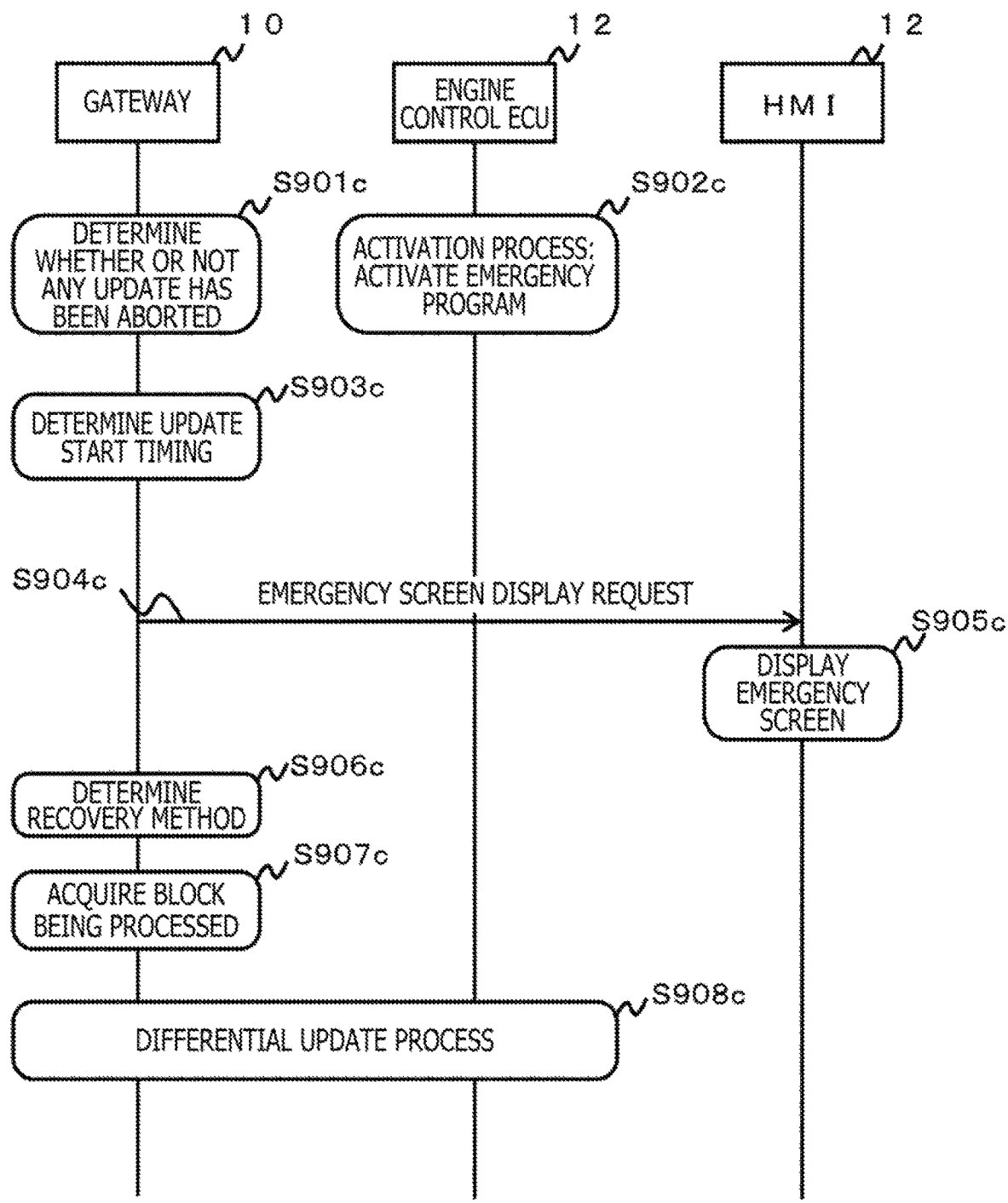

FIG. 21A
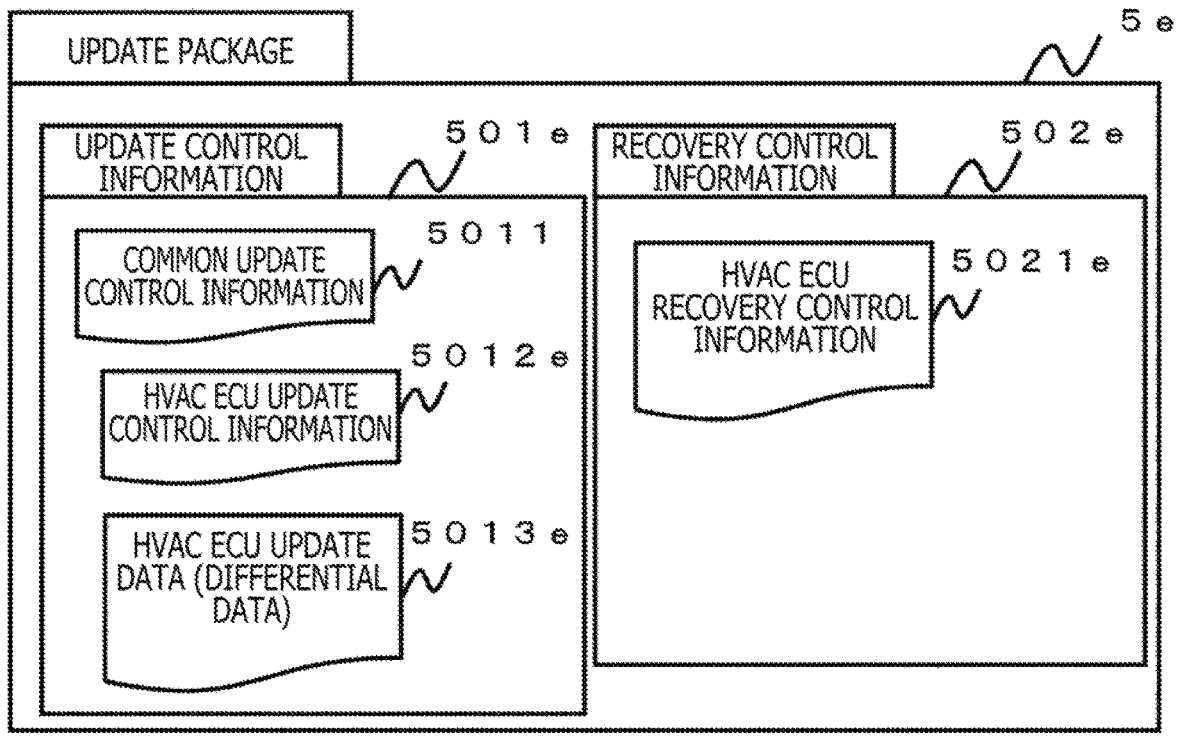
FIG. 21B
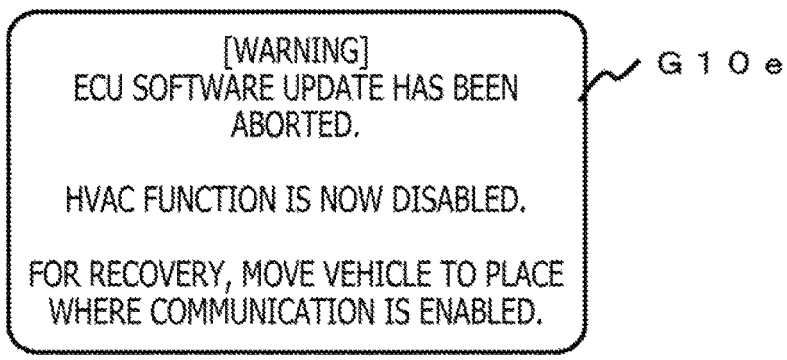
FIG. 21C

FIG. 29A

| | |
|---|---|
| ECU ID | SELF-DRIVING ECU |
| NUMBER OF PIECES OF RECOVERY CONTROL INFORMATION | 2 |
| CAUSE OF ABORTION | POWER SHUTDOWN OR COMMUNICATION DISCONNECTION |
| START TIMING | TRAVELING STATE |
| DISPLAY CONTENT | ATTENTION CALLING |
| RECOVERY METHOD | DIFFERENTIAL RESUME |
| RECOVERY DATA | NULL |
| CAUSE OF ABORTION | FROM FAILURE |
| START TIMING | IMMEDIATE |
| DISPLAY CONTENT | EMERGENCY |
| RECOVERY METHOD | NULL |
| RECOVERY DATA | NULL |

FIG. 29B

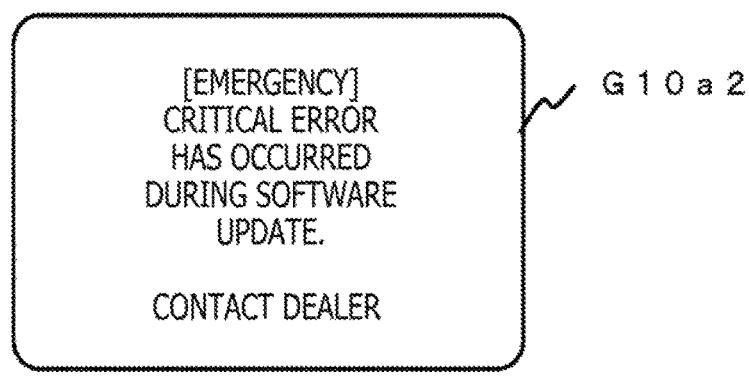

[EMERGENCY]
CRITICAL ERROR
HAS OCCURRED
DURING SOFTWARE
UPDATE.

CONTACT DEALER

FIG. 29C

| ECU ID | UPDATE START STATE | BLOCK BEING PROCESSED | COMPLETED COMMAND | SUCCESSFULLY PROCESSED BLOCK | CAUSE OF ABORTION |
|---|---|---|---|---|---|
| SELF-DRIVING ECU | ALREADY STARTED | Block n-1 | DATA TRANSFER START REQUEST | Block n | FROM FAILURE |

SOFTWARE UPDATE DEVICE, SOFTWARE UPDATE METHOD, AND SOFTWARE UPDATE SYSTEM

TECHNICAL FIELD

The present invention relates to a software update device, software update method, and a software update system.

BACKGROUND ART

In recent years, advanced driving assistance functions and self-driving techniques have increased the scale of software installed in an Electric Control Unit (ECU) for cars. Furthermore, this leads an increase not only in the number of recalls due to software problems but also in the number of cars needing to be dealt with per recall. Thus, there has been a growing need for techniques for remotely updating software installed in the ECU. For remote update of software, the process needs to be automated as much as possible unlike in a case where an engineer in a dealer or the like performs an update operation. Thus, it is important to be able to recover to a normal state without a need for the operation of the engineer or the like even in a case where an abnormality such as power shutdown occurs to abort the update process.

For example, PTL 1 discloses a technique in which two areas are prepared where execution software is stored and in which, in a case where an abnormality in software update occurs, normal software is selected and executed to prevent the system from being affected even when the abnormality in update occurs.

PRIOR ART DOCUMENT

Patent Document

Patent Document 1: Japanese Patent No. 4548601

SUMMARY OF THE INVENTION

Problem to be Solved by the Invention

An invention described in Patent Document 1 is prevented from being applied to a device with scarce memory resources, and has difficulty dealing with diversity of devices for which software is to be updated.

Means for Solving the Problem

A software update device according to a first aspect of the present invention is connected to a control device and includes an update control unit executing an update process of causing software for the control device to transit from a non-updated state to a completely updated state, a recovery control information managing unit acquiring recovery control information, and a recovery control unit executing a recovery process of causing the software to transit to the completely updated state on a basis of the recovery control information in a case where an abnormality in the update process has prevented the software from transiting to the completely updated state.

A software update method according to a second aspect of the present invention is executed by a software update device connected to a control device and includes executing an update process of causing software for the control device to transit from a non-updated state to a completely updated state, acquiring recovery control information, and executing a recovery process of causing the software to transit to the completely updated state on a basis of the recovery control information in a case where an abnormality in the update process has prevented the software from transiting to the completely updated state.

A software update system according to a third aspect of the present invention includes the software update device and a server transmitting the recovery control information to the software update device.

Effect of the Invention

According to the present invention, the recovery process corresponding to diverse devices can be executed.

BRIEF DESCRIPTION OF THE DRAWINGS

FIG. 3 is a diagram illustrating an example of an update state D1.

FIG. 17A and FIG. 17B are diagrams illustrating an example of an update package corresponding to the engine control ECU, and FIG. 17C is a diagram illustrating an example of screen display.

FIG. 18 is a sequence diagram illustrating an example of a recovery process of the engine control ECU.

FIG. 21A and FIG. 21B are diagrams illustrating an example of an update package corresponding to an HVAC ECU, and FIG. 21C is a diagram illustrating an example of screen display.

FIG. 29A is a diagram illustrating an example of the recovery control information corresponding to the self-driving ECU, FIG. 29B is a diagram illustrating an example of screen display, and FIG. 29C is a diagram illustrating an example of the update state D1.

MODES FOR CARRYING OUT THE INVENTION

First Embodiment

A software update system according to a first embodiment will now be described with reference to FIG. 1 to FIG. 24. Update of software will be described in the present embodiment. However, the present embodiment is not limited to software but is applicable to parameters or data.

<Definition of Update and Recovery>

"Update" and "recovery" of software in the present embodiment are defined as described below. That is, the "update" of software in the present embodiment refers to causing the software to transit from a non-updated state to a completely updated state. Furthermore, the "recovery" of software in the present embodiment refers to causing the software to transit to the completely updated state in a case where an abnormality in an update process has prevented the software from transiting to the completely updated state.

However, the software may be composed of a single program or a plurality of programs. Moreover, the software may include not only the program but also various parameters, text information, voice information, image information, and the like needed to execute the program.

<Configuration>

(System Configuration)

Figure 1:
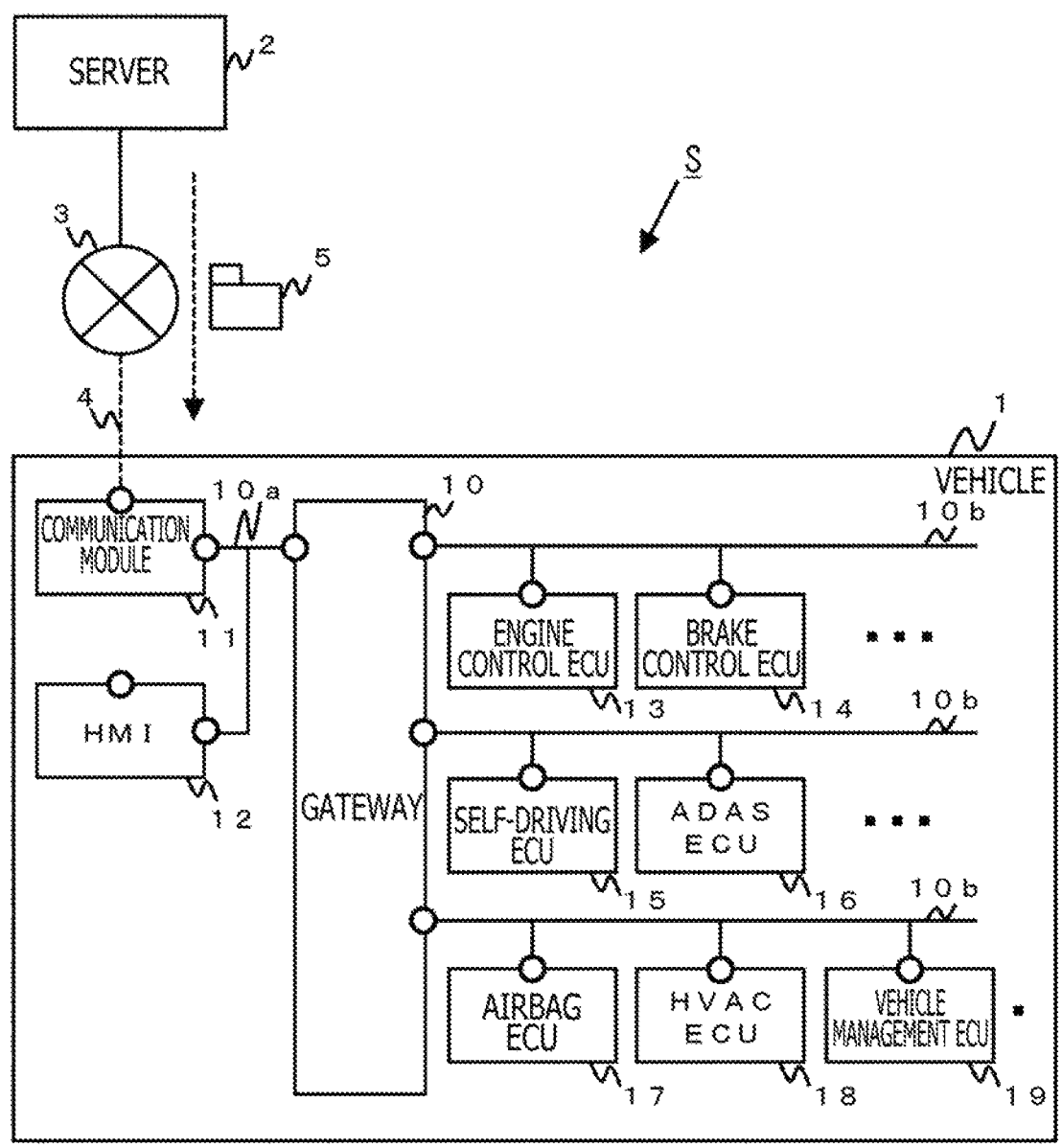
FIG. 1 is a diagram illustrating a configuration of a software update system.

FIG. 1 is a diagram illustrating a configuration of a software update system S according to a first embodiment. The software update system S includes a vehicle 1 and a server 2. The vehicle 1 and the server 2 are connected together via the Internet 3 to which an access network and a hub are connected, and an access network 4 provided by a communication service provider.

The vehicle 1 includes a gateway 10, a communication module 11, a Human Machine Interface (HMI) 12, a group of ECUs needed by the vehicle 1 to implement functions such as traveling and including an engine control ECU 13, a brake control ECU 14, a self-driving ECU 15, an Advanced Driver-Assistance System (ADAS) ECU 16, an airbag ECU 17, Heating Ventilation Air Conditioning (HVAC) ECU 18, and a vehicle managing ECU 19, and in-vehicle networks 10a and 10b connecting the group of ECUs together.

In the present embodiment, an example will be described in which a control program for the engine control ECU 13 is updated from a current version, that is, version 2, to version 3 corresponding to a new version. For the control program, an old version preceding the current version, that is, version 2, is 1.

The in-vehicle network is composed of Control Area Network (CAN) (registered trademark), Local Interconnect Network (LIN), FlexRay, Ethernet (registered trademark), or the like. In the present embodiment, the in-vehicle network 10b is composed of CAN, and the in-vehicle network 10a is composed of Ethernet. Furthermore, although not illustrated in FIG. 1, components in the vehicle such as the various ECUs are connected to batteries through power lines and supplied with power.

The gateway 10 relays communication data among the various ECUs and is used as a software update device to update software installed in the ECUs connected together via the gateway 10 and the in-vehicle network.

The communication module 11 relays communication between the server 2 and the gateway 10, the HMI 12, and the various ECUs. The HMI 12 is a device configured to present information to a user that is an occupant in the vehicle 1 and to accept inputs from the user. The HMI 12 is composed of a display device providing screen display and an input device with various switches or the like, or a touch panel including a combination of the display device and the input device. The engine control ECU 13 controls an engine. The brake control ECU 14 controls a brake. The self-driving ECU 15 performs recognition of an environment, issuance of an instruction to start the vehicle, and the like during self driving. The ADAS ECU 16 performs driver-assistance control such as automatic braking. The airbag ECU 17 controls an airbag. The HVAC ECU 18 performs in-vehicle air-conditioning control. The vehicle managing ECU 19 manages a vehicle state.

The server 2 includes a CPU, a ROM, and a RAM that are not illustrated and transmits, to the gateway 10, an update package 5 needed to update software. A configuration of the update package 5 will be described below. The gateway 10 updates software for each of the ECUs on the basis of data included in the update package 5.

(Configuration of Gateway)

Figure 2A:
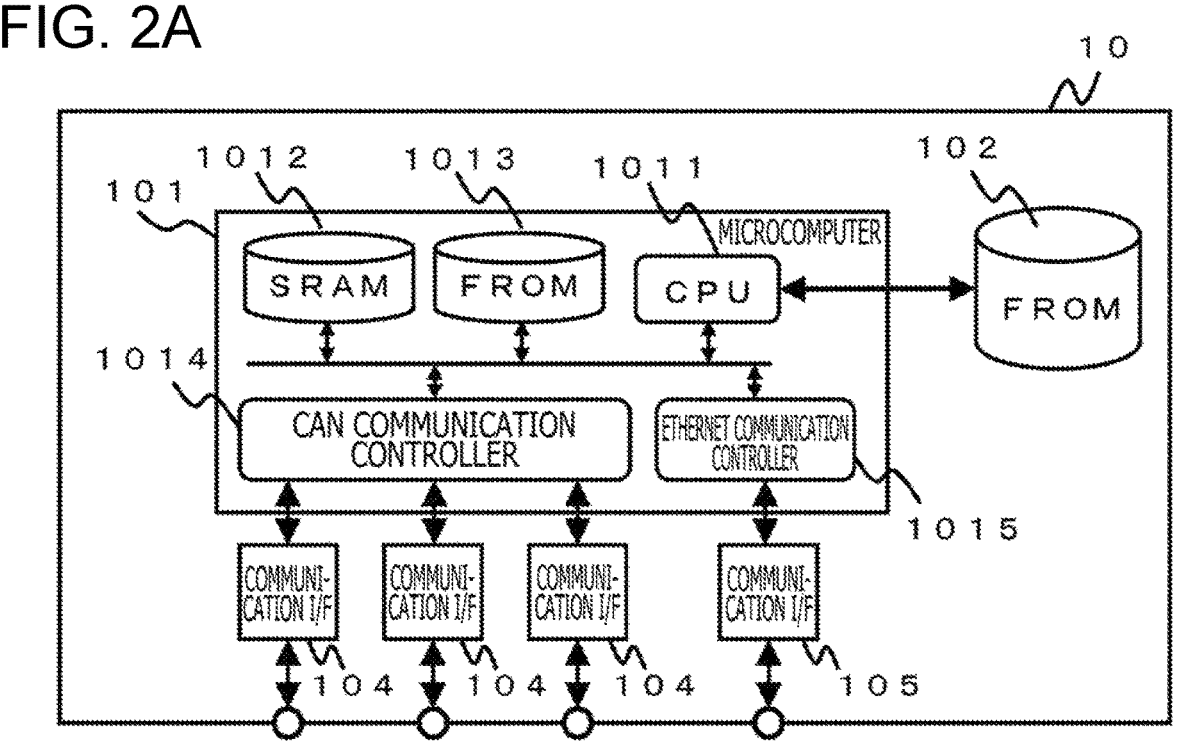
FIG. 2A is a block diagram illustrating a hardware configuration of a gateway.

FIG. 2(a) is a block diagram illustrating a hardware configuration of the gateway 10. The gateway 10 includes a microcomputer 101, an FROM (FlashROM) 102, a communication I/F 104 for CAN, and a communication I/F 105 for Ethernet.

The microcomputer 101 includes a CPU 1011, an SRAM 1012, an FROM 1013, a CAN communication controller 1014, and an Ethernet communication controller 1015. The CPU 1011 of the microcomputer 101 executes a program stored in the FROM 1013 to, for example, control other components in the gateway 10 and transmit and receive data to and from other pieces of equipment connected to the gateway 10 through the in-vehicle network to give instructions to the equipment. The CPU 1011 thus cause the gateway 10 to function.

The FROM 102 is a nonvolatile memory in which the received update package 5 is stored.

The communication I/F 104 is an interface for CAN communication and transmits and receives data to and from the ECUs connected to the in-vehicle network 10b, via the in-vehicle network 10b on the basis of instructions from the microcomputer 101.

The communication I/F 105 is an interface for Ethernet communication and transmits and receives data to and from the equipment connected to the in-vehicle network 10a, via the in-vehicle network 10a on the basis of instructions from the microcomputer 101.

Figure 2B:
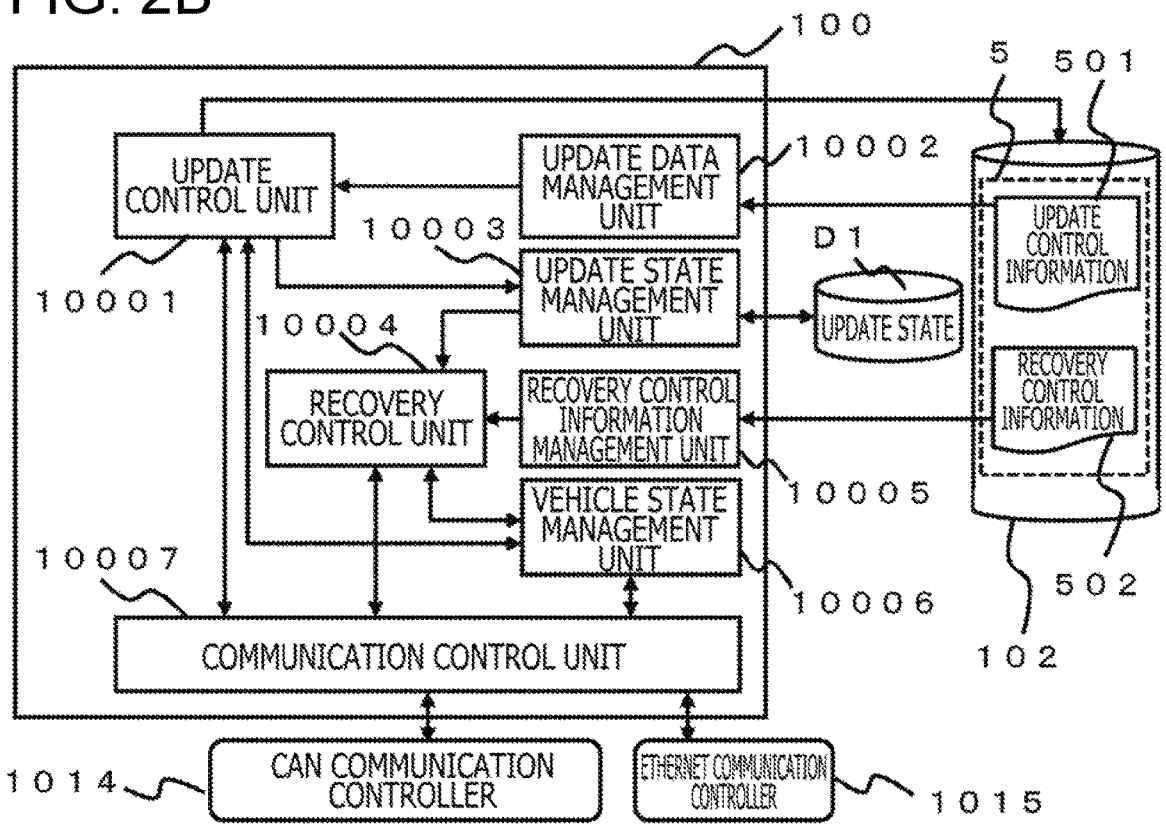
FIG. 2B is a block diagram illustrating a configuration of a gateway program operating on the gateway.

FIG. 2(b) is a block diagram illustrating a configuration of a gateway program 100 operating on the gateway 10.

The gateway program 100 implementing the functions of the gateway 10 is stored in the FROM 1013 of the microcomputer 101 and executed by the CPU 1011. In FIG. 2(b), functional sets are represented as blocks. Each of the blocks may be divided into a plurality of blocks or a number of blocks may be integrated together. Furthermore, the control program may be implemented by one piece of software or a combination of two or more pieces of software.

The gateway program 100 includes an update control unit 10001, an update data managing unit 10002, an update state managing unit 10003, a recovery control unit 10004, a recovery control information managing unit 10005, a vehicle state managing unit 10006, and a communication control unit 10007.

The update control unit 10001 communicates, via the communication control unit 10007, with the equipment connected to the in-vehicle network 10a to acquire the update package 5 and transmit a state of the vehicle and a status of a software update process. The update package 5 acquired by the update control unit 10001 is stored in the FROM 102. As described below in detail, the update package 5 is composed of update control information 501 and recovery control information 502. Furthermore, the update control unit 10001 communicates, via the communication control unit 10007, with the equipment connected to the in-vehicle network 10b to control the ECUs to update software installed in the ECUs. Here, the software is updated on the basis of the update control information 501 acquired via the update data managing unit 10002 and a vehicle system state acquired via the vehicle state managing unit 10006.

The update data managing unit 10002 acquires the update control information 501 from the FROM 102, and provides the update control information 501 to the update control unit 10001.

The update state managing unit 10003 acquires an update state from the update control unit 10001, and stores the update state in the FROM 1013 as an update state D1. Furthermore, the update state managing unit 10003 provides the stored update state D1 to the recovery control unit 10004.

The recovery control unit 10004 communicates, via the communication control unit 10007, with the equipment connected to the in-vehicle network 10b to control the ECU to execute a software recovery process. Here, the recovery process of the ECU is executed on the basis of the update state D1 acquired via the update state managing unit 10003, the recovery control information 502 acquired via the recovery control information managing unit 10005, and the vehicle system state acquired via the vehicle state managing unit 10006.

The recovery control information managing unit 10005 acquires the recovery control information 502 from the FROM 102 and provides the recovery control information 502 to the recovery control unit 10004.

The vehicle state managing unit 10006 communicates, via the communication control unit 10007, with the equipment connected to the in-vehicle networks 10a and 10b to acquire the state of the vehicle system. The vehicle state managing unit 10006 provides the vehicle state to the update control unit 10001 and the recovery control unit 10004. The vehicle state refers to, for example, turn-on and -off of an ignition and start of traveling.

The communication control unit 10007 controls, in accordance with instructions from the update control unit 10001 and the like, the CAN communication controller 1014 and the Ethernet communication controller 1015 to communicate with the equipment connected to the in-vehicle networks 10a and 10b. When communicating with the equipment connected to the in-vehicle network 10a, the communication control unit 10007 analyzes and generates, for example, TCP/IP and UDP/IP packets. Furthermore, when communicating with the equipment connected to the in-vehicle network 10a, the communication control unit 10007 analyzes and generates CAN frames. Furthermore, the communication control unit 10007 generates and analyzes commands in conformity with a diagnosis communication protocol such as Universal Diagnosis Service (UDS).

FIG. 3 is a diagram illustrating an example of the update state D1 managed by the update state managing unit 10003 of the gateway 10. FIG. 3 illustrates an example of a case where the update state D1 is managed as a table and where the update state is recorded on an ECU-by-ECU basis.

The update state D1 includes fields of an ECU ID D101, an update start state D102, a block being processed D103, a completed command D104, and a successfully processed block D105.

The ECU ID D101 is a field in which information for identifying the ECU is stored. The update start state D102 is a field in which an update process for the ECU has been started. The update start state D102 includes, for example, "not started yet," "already started," or "update completed." The block being processed D103 is a field in which, in the update process for the ECU, identification information about a block being processed is stored. A block number or the like is stored in the block being processed D103. The completed command D104 is a field in which, in the update process for the ECU, identification information about the last successful command is stored. A command identification information such as "Data Transfer Start Request" is stored in the completed command D104. The successfully processed block D105 is a field in which identification information about a successfully processed block is stored. A block number or the like is stored in the successfully processed block D105.

A record D11 is a record indicative of the update state of the self-driving ECU 15. "Self-Driving ECU" is stored in the ECU ID D101 field. "Already Started" indicating that the update process is in execution is stored in the update start state D102 field. "Block n−1" indicating that a block n−1 is being processed is stored in the field of block being processed D103. "Data Transfer Start Request" indicating that a data transfer start request has been accepted is stored in the field of completed command D104. "Block n" indicating that the last completely processed block is a block n is stored in the field of successfully processed block D105.

A record D12 is a record indicative of the update state of the engine control ECU 13. "Engine control ECU" is stored in the field of ECU ID D101. "Not Started Yet" indicating that the update process has not been started yet is stored in the field of update start state D102. Here, update of the engine control ECU has not been started yet, and thus, no value is set in the other fields in the record D12.

Here, the two records, the record D11 and the record D12, have been described and are created in the following case. That is, the records are created in a case where the update package 5 received by the gateway 10 describes the ECU as an ECU to be updated. Furthermore, the update state D1 is sequentially recorded as described below. Sequential recording of the update state D1 as described above allows an appropriate recovery process to be started with the following recognition at the time of normal recovery and activation after abortion of update: the recognition that the update has been aborted rather than being completed and the recognition of a point of abortion of the update.

(Configuration of ECUs)

Figure 4A:
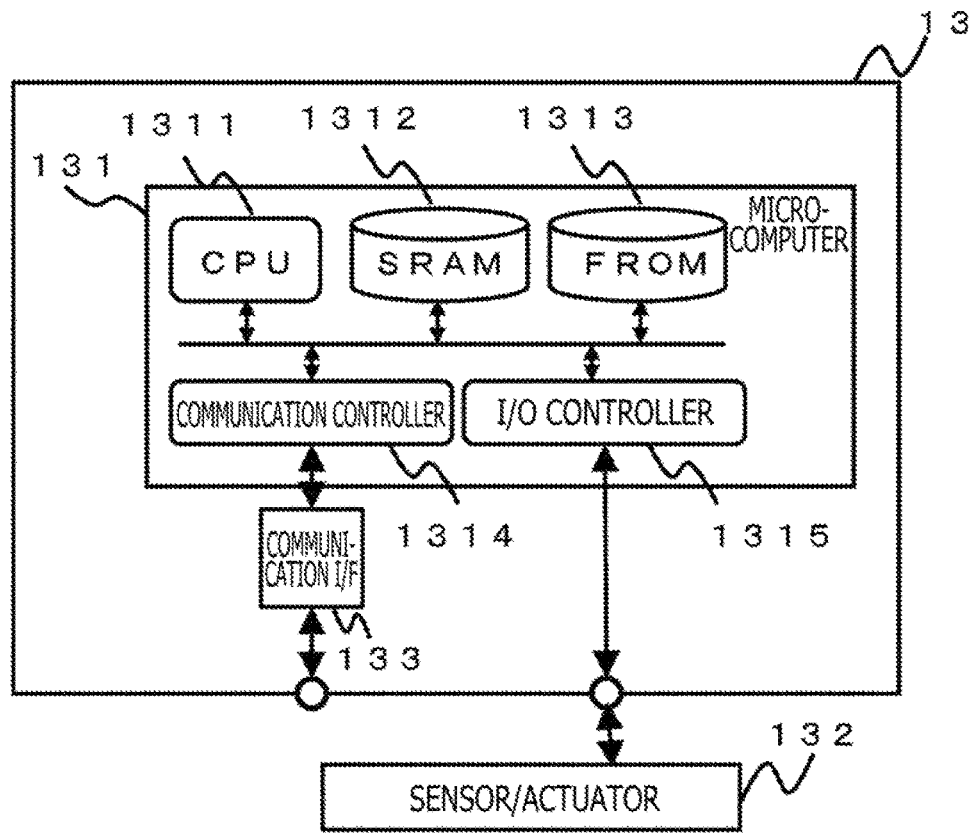
FIG. 4A is a hardware configuration of an engine control ECU.

FIG. 4(a) is a block diagram of an example of a hardware configuration of the engine control ECU 13. However, in the present embodiment, all ECUs for which software is to be updated include at least the hardware configuration illustrated in FIG. 4(a). The engine control ECU 13 includes a microcomputer 131 and a communication I/F 133 for CAN.

The microcomputer 131 includes a CPU 1311, an SRAM 1312, an FROM 1313, a communication controller 1314, and an I/O controller 1315. The microcomputer 131 executes a control program stored in the FROM 1313 to control the other components in the engine control ECU 13 and a sensor/actuator 132 connected to the microcomputer 131 via I/Os and transmit and receive data to and from other pieces of equipment connected to the microcomputer 131 through the in-vehicle network to give instructions to the equipment. The microcomputer 131 thus performs engine control. In accordance with instructions from the microcomputer 131, the sensor/actuator 132 controls the engine while acquiring data needed for engine control.

Figure 4B:
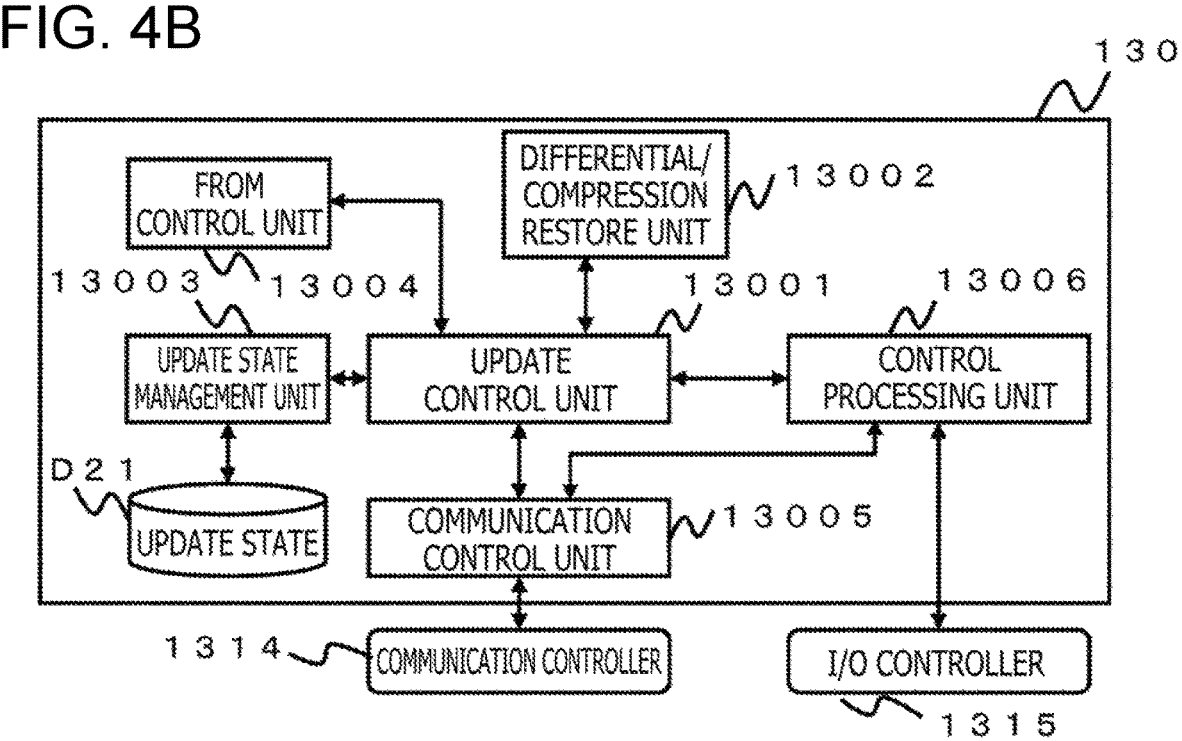
FIG. 4B is a block diagram illustrating a configuration of a control program operating on the engine control ECU.

FIG. 4(b) is a block diagram illustrating a configuration of a control program 130 operating on the engine control ECU 13. However, in the present embodiment, all ECUs for which software is to be updated include at least a configuration similar to the configuration of the control program 130 illustrated in FIG. 4(b).

The control program 130 implementing the functions of the ECU 13 is stored in the FROM 1313 of the microcomputer 131 and executed by the CPU 1311. In FIG. 4(b), functional sets are represented as blocks. Each of the blocks may be divided into a plurality of blocks or a number of blocks may be integrated together. Furthermore, the control program may be implemented by one piece of software or a combination of two or more pieces of software.

The control program 130 includes an update control unit 13001, a differential/compression restore unit 13002, an update state managing unit 13003, an FROM control unit 13004, a communication control unit 13005, and a control processing unit 13006.

The update control unit 13001 receives, via the communication control unit 13005, operation commands from the gateway 10 and data used for software update to control the differential/compression restore unit 13002 and the FROM control unit 13004, thus controlling software update. The differential/compression restore unit 13002 restores the latest software, that is, version 3 software, from received differential data and compressed data in accordance with instructions from the update control unit 13001.

The update state managing unit 13003 acquires the update state from the update control unit 13001 and stores the update state in the FROM 1313 as an update state D21. Furthermore, the update state managing unit 13003 provides the stored update state D21 to the update control unit 13001. The FROM control unit 13004 writes the latest version software to the FROM 1313 in accordance with an instruction from the update control unit 13001. In accordance with instructions from the update control unit 13001 and the like, the communication control unit 13005 controls the communication controller 1314 to communicate with the equipment connected to the in-vehicle network 10b. For communication, the communication control unit 13005 analyzes and configures CAN frames. Furthermore, the communication control unit 13005 generates and analyzes commands in conformity with the diagnosis communication protocol such as UDS. The control processing unit 13006 implements engine control by controlling the I/O controller 1315 and controlling the sensor/actuator 132.

FIG. 5 is a configuration diagram illustrating a configuration example of the FROM of the ECU. Two types of configurations will be described on the basis of whether the FROM 1313 has a large or small capacity. However, the FROM 1313 having a large capacity is hereinafter also represented as the FROM 1313 "including much memory" and that the FROM 1313 having a small capacity is hereinafter also represented as the FROM 1313 "including little memory." Whether the FROM 1313 has a large or small capacity, that is, whether the ECU includes much or little memory, is determined on the basis of a real amount of the FROM 1313, a size of a program stored in the FROM 1313, a property of the program stored in the FROM 1313, a tendency of an amount of data stored in the FROM 1313, and the like. In general, the ECUs executing complicated processes are classified as ECUs including much memory in the present embodiment. The ECUs executing only simple processes are classified as ECUs including little memory in the present embodiment. For example, the engine control ECU 13, the brake control ECU 14, the HVAC ECU 18, the airbag ECU 17, and the like are often classified as ECUs including little memory. The self-driving ECU 15, the ADAS ECU 16, and the like are often classified as ECUs including much memory.

Figure 5A:
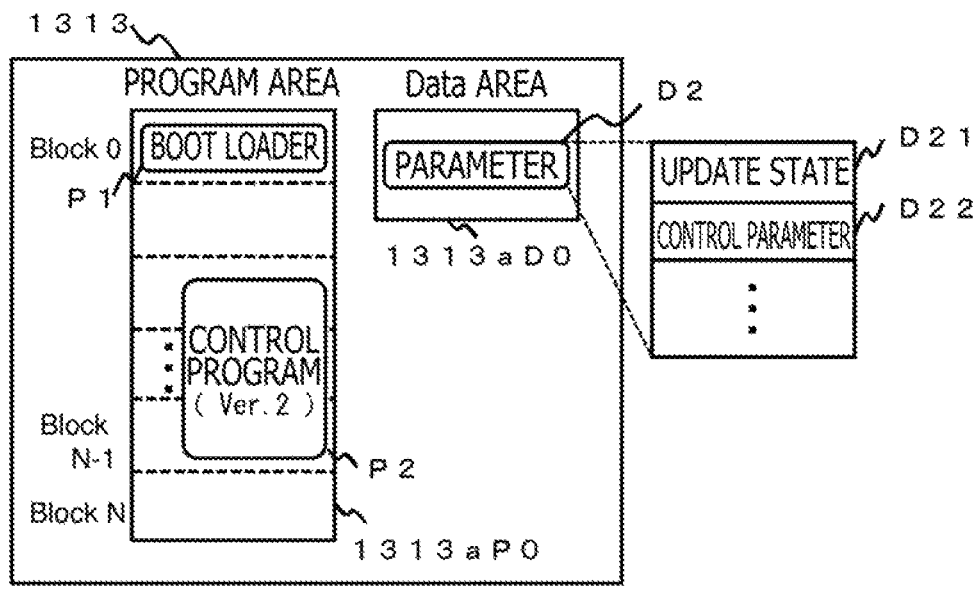
FIG. 5A is a diagram illustrating a configuration example of an FROM with a small capacity.

FIG. 5(a) illustrates a configuration example of the FROM 1313 in a case where the ECU has a small capacity.

The FROM 1313 is composed of a program area 1313aP0 and a Data area 1313aD0.

The program area 1313aP0 is composed of a plurality of blocks Block0 to BlockN, and a boot loader P1 and a control program P2 are stored in the program area 1313aP0. The control program P2 is of the current version, version 2 (described as "Ver. 2" in FIG. 5(a)). A parameter D2 is stored in the Data area 1313aD0. The parameter D2 includes the update state D21 and a control parameter D22. The update state D21 is information indicative of progress of software update and the like and will be described below in detail. The control parameter D22 is a group of parameters utilized for engine control and brake control originally performed by the ECUs.

Figure 5B:
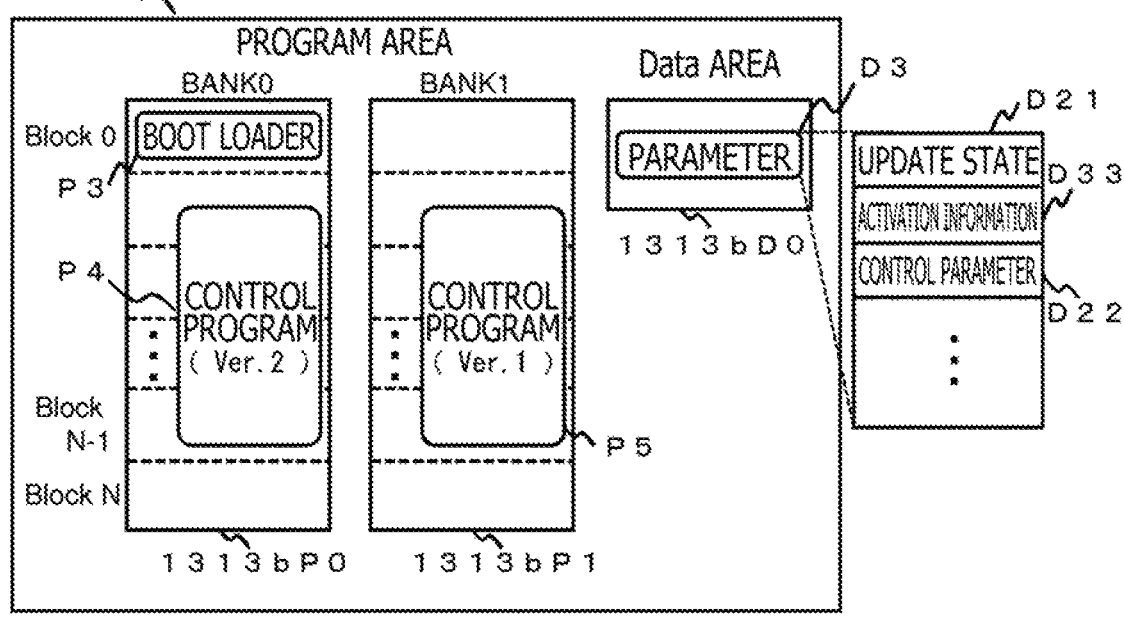
FIG. 5B is a diagram illustrating a configuration example of an FROM with a large capacity.

FIG. 5(b) illustrates a configuration example of the FROM 1313 in a case where the ECU has a large capacity.

The FROM 1313 is composed of a program area and a Data area 1313bD0. The program area is composed of two areas, that is, BANK0 and BANK1, which are hereinafter respectively referred to as a program area 1313bP0 and a program area 1313bP1.

Each of the program area 1313bP0 and the program area 1313bP1 is composed of a plurality of blocks Block0 to BlockN. A boot loader P3 and a control program P4 are stored in the program area 1313bP0. The control program P4 is of the current version, version 2. Furthermore, a control program P5 is stored in the program area 1313bP1. The control program P5 is of the old version, version 1.

A parameter D3 is stored in the Data area 1313bD0. The parameter D3 includes the update state D21, the control parameter D22, and activation information D33.

The activation information D33 includes setting of which of the two control programs recorded in the respective program areas is to be executed, for example, setting of "Program Area 1313bP0" or "Program Area 1313bP1." The update state D21 and the control parameter D22 are as described above.

Figure 6A:
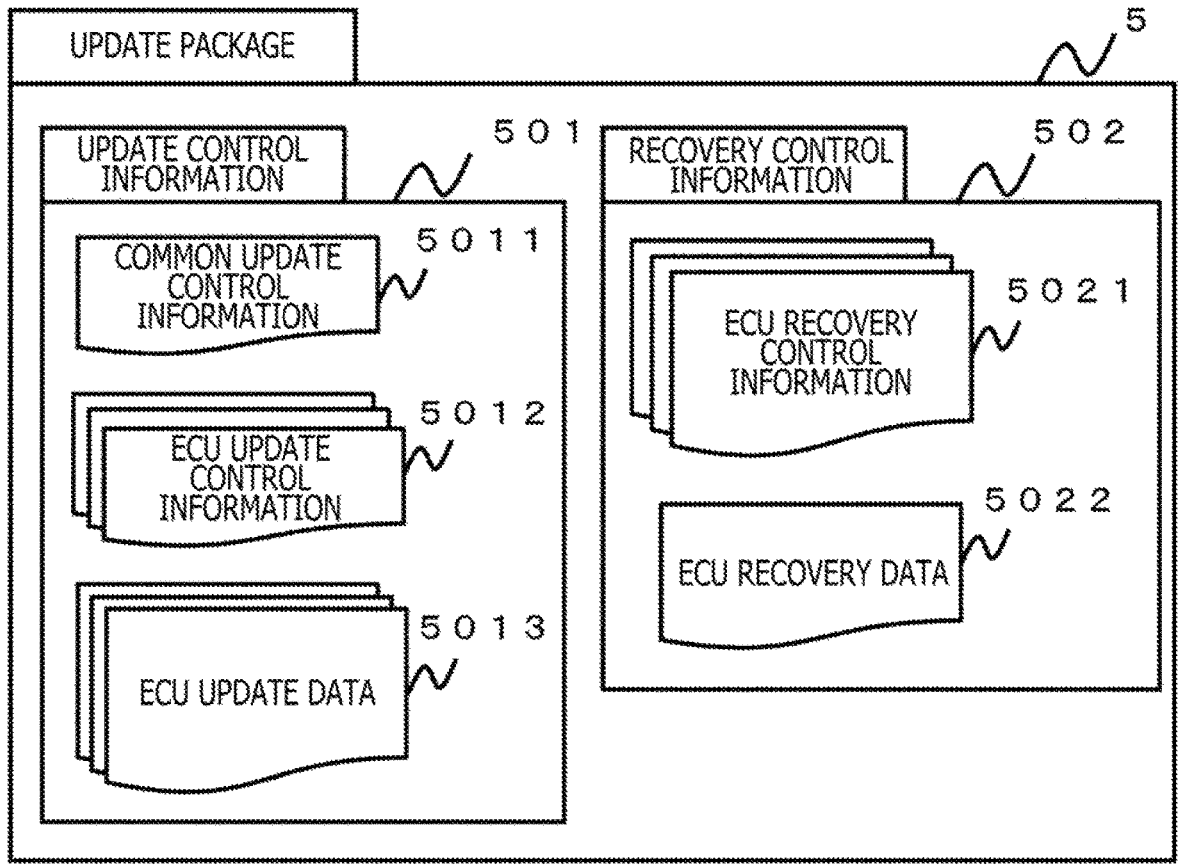
FIG. 6A is a diagram illustrating a configuration of an update package in a first embodiment.

FIG. 6(a) illustrates a configuration example of the update package 5 acquired from the server 2 by the gateway 10. The update package 5 is composed of the update control information 501 and the recovery control information 502.

The update control information 501 is composed of one piece of common update control information 5011, one or more pieces of ECU update control information 5012, and one or more pieces of ECU update data 5013. The ECU update control information 5012 and the ECU update data 5013 are present for each ECU to be updated. Only one piece of common update control information 5011 is present regardless of the number of ECUs to be updated.

The common update control information 5011 includes information such as procedures and thresholds used to check the state of the whole vehicle system. For example, the common update control information 5011 includes ECU IDs, CAN IDs, and information of check commands needed for a check on a remaining amount of batteries, a threshold for a remaining amount at which update can be started, a check of whether or not HVAC is present, and a check on a vehicle traveling state, as state checks needed to start update.

The ECU update control information 5012 is configured for each ECU to be updated. The ECU update control information 5012 includes information including check items and an update control procedure for each ECU.

The ECU update data 5013 is data configured for each ECU to be updated and used for software update of the ECU. The ECU update data 5013 is, for example, software itself, compressed software, or differential data between the old software and the new software.

The recovery control information 502 is composed of one or more pieces of ECU recovery control information 5021 and may include one or more ECU recovery data 5022. The ECU recovery control information 5021 is present for each ECU to be updated, and whether or not the ECU recovery data 5022 is present is determined on the basis of contents of the ECU recovery control information 5021. That is, the ECU recovery data 5022 has a maximum number identical to the number of pieces of recovery control information 5021 and a minimum number of zero.

The ECU recovery data 5022 is data provided in a case where additional data is needed for recovery of the ECU. The ECU recovery data 5022 includes software itself, compressed software, or backup data generated in blocks by XOR of software.

Figure 6B:
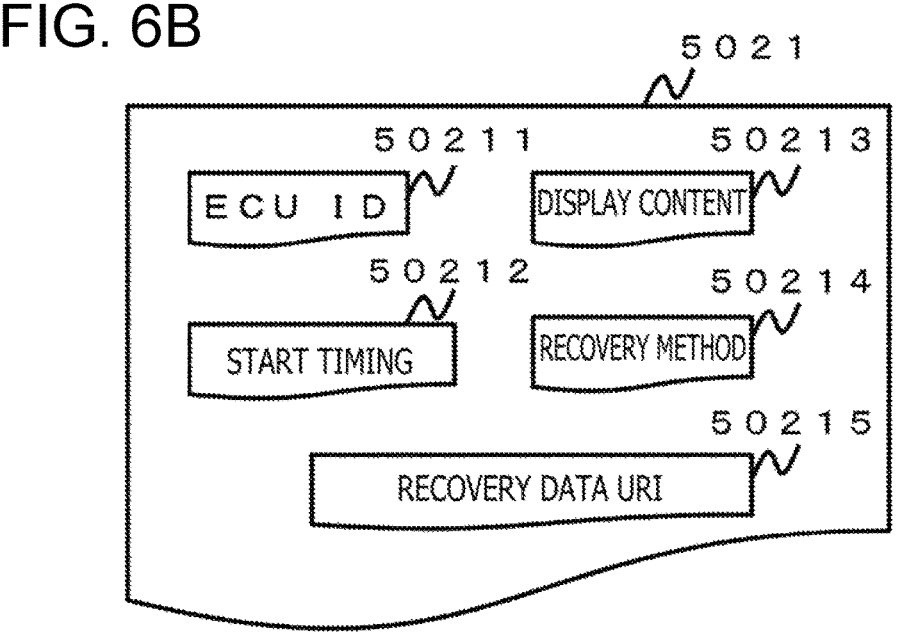
FIG. 6B is a diagram illustrating ECU recovery control information in the first embodiment.

FIG. 6(b) is a diagram illustrating a configuration example of the ECU recovery control information 5021. The ECU recovery control information 5021 is composed of an ECU ID 50211 identifying the ECU, a start timing 50212 indicative of a timing to start recovery, a display content 50213 indicative of a content displayed on a screen of a display device of the HMI 12, a recovery method 50214 that is a method for recovery, and a recovery data URI 50215 used to acquire additional recovery data.

The ECU ID 50211 is information for identifying the ECU. The recovery start timing 50212 is indicative of a timing for the gateway 10 to start a recovery process. For example, "Immediate," "Traveling Start", or "IGN-OFF" is set in the recovery start timing 50212; "Immediate" is indicative of a timing immediately after the system recovers from an abnormality, "Traveling Start" is indicative of a timing after stabilization of a power supply following start of traveling, and "IGN-OFF" is indicative of a next timing when the engine transits from an operating state to a stop state.

The display content 50213 contains display message information containing a message to be presented to the user when, for example, the system recovers from an abnormality, and also contains a summary of the display content. The summary of the display content is, for example, "Attention Calling," "Warning," and "Emergency." Specific examples displayed on the basis of the display content 50213 will be described below.

The recovery method 50214 indicates what procedure is used to recover the ECU, and includes setting of "Differential Resume," "Compression Recovery," "Server Cooperation," and "Block Recovery." "Differential Resume" is a method for a recovery process of resuming differential update at a point where the update has been aborted. "Compression Recovery" is a method for a recovery process of packaging compressed software in the recovery control information 502 as the ECU recovery data 5022 and performing what is called full update including rewriting the entire software using the ECU recovery data 5022. "Server Cooperation" is a method for a recovery process of re-downloading compressed software from the server 2 and performing what is called full upload. "Block Recovery" is a method for a recovery process of dividing software into a plurality of blocks, calculating XOR of the blocks, packaging resultant block XOR data as the ECU recovery data 5022, and recovering a defective portion of the software using the block XOR data and non-defective blocks.

A URI for which the gateway 10 acquires recovery data is set in the recovery URI 50215 in a case where the recovery method 50214 is "Server Cooperation." In the case where the recovery method 50214 is "Servo Cooperation," "NULL" meaning that no information is set in the recovery data URI 50215 is set in the recovery data URI 50215. The resource indicated by the URI may be stored in the server 2 or at another location.

Figure 7:
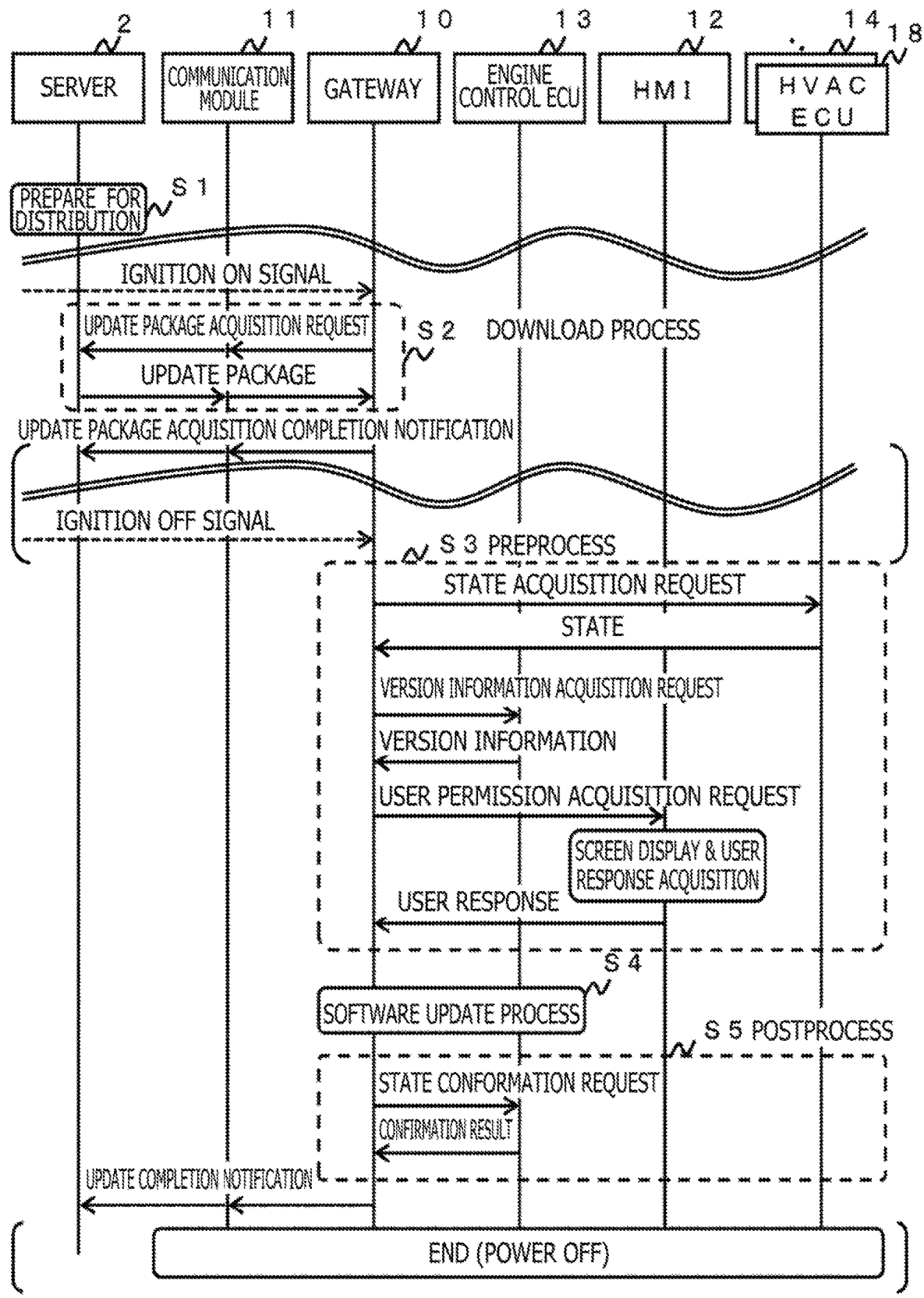
FIG. 7 is a sequence diagram illustrating an entire update process of updating software for the engine control ECU.

FIG. 7 is a sequence diagram illustrating a flow of the entire update process of updating the software for the engine control ECU 13. In the description below, only the engine control ECU 13 is assumed to be updated and the other ECUs are assumed not to be updated.

When new software for the engine control ECU 13 is created, an operator of the server 2 prepares for distribution of the software to the engine control ECU 13 and creates and registers the update package 5 in the server 2 (S1). The update package 5 may be created by the operator or by the server 2 on the basis of new created software and a setting file.

After the preparation for distribution is completed, when, for example, the engine is started, the gateway 10 downloads the update package 5 from the server 2 via the communication module 11 and holds the update package 5 in the FROM 102 (S2). Subsequently, when, for example, an engine state transits from a being-started state to a stopped state, the gateway 10 performs a check on the version of the engine control ECU 13 to be updated, acquisition of the state of the ECU to be updated, and a preprocess S3 of acquiring acceptance from the user using the HMI 12, and then executes a software update process S4 on the engine control ECU 13. Finally, the gateway 10 executes a postprocess S5 of checking a rewrite state of the ECU 13 to be updated, to complete the update process. A timing to start the preprocess S3, the software update process S4, and the postprocess S5, which correspond to the update process, may be, besides a timing while the engine is stopped, a timing immediately after the download process S2 is completed, a predetermined point in time, or the like. The software update process illustrated by reference sign S4 will be described below in detail.

Figure 8:
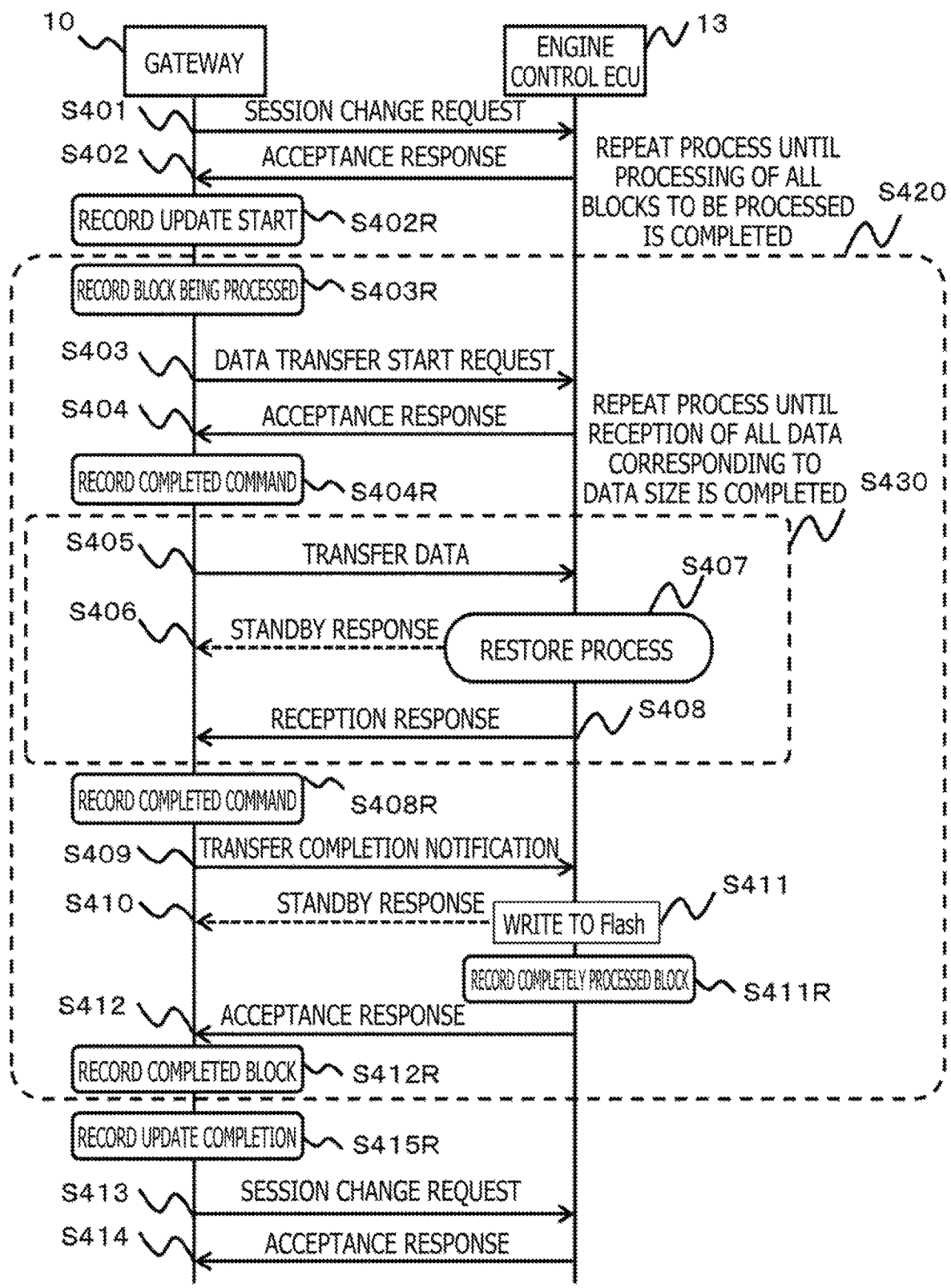
FIG. 8 is a sequence diagram illustrating a flow of the software update process executed between the gateway and the engine control ECU in step S4 in FIG. 7.

FIG. 8 is a sequence diagram illustrating a flow of a software update process executed between the gateway 10 and the engine control ECU 13 in step S4 in FIG. 7. Here, an example in which the engine control ECU 13 is updated is illustrated. However, the present operation basically similarly applies to the other ECUs. In FIG. 8, an as-needed process is illustrated by a dashed arrow.

In the description below, transmission and reception of data at the gateway 10 are assumed to be performed via the communication control unit 10007, and transmission and reception of data at the engine control ECU 13 are assumed to be performed via the communication control unit 13005.

First, the update control unit 10001 of the gateway 10 transmits a session change request to the engine control ECU 13 (S401). The session change request includes identification information about a special mode for software rewrite. The update control unit 13001 of the engine control ECU 13 receives the session change request transmitted from the gateway 10 in step S402, then causes an internal state to transit to a mode specified in the session change request, and subsequently transmits an acceptance response to the gateway 10 (S402).

The update control unit 10001 of the gateway 10 receives the acceptance response transmitted from the engine control ECU 13 in step S402, and then records start of an update applying process, in the update state D1 via the update state managing unit 10003 (S402R). The update control unit 10001 of the gateway 10 then reads the ECU update control information 5012 via the update data managing unit 10002 and starts processing each of process blocks recorded in the ECU update control information 5012. That is, the update control unit 10001 identifies the first process block described in the ECU update control information 5012, and records the block in the update state D1 via the update state managing unit 10003 as "Block Being Processed" (S403R).

The update control unit 10001 then transmits a data transfer start request for the block to the engine control ECU 13 (S403). The data transfer start request includes information on, for example, a data format, a size of data scheduled to be transmitted, and a write destination address indicative of a write destination of transmitted data. The communication control unit 13005 of the engine control ECU 13 receives the data transfer start request transmitted from the gateway 10 in step S403 and then transmits an acceptance response to the gateway 10 (S404). The acceptance response includes information such as a size of data that can be received by the engine control ECU 13 at a time. The update control unit 10001 of the gateway 10 receives the acceptance response, and then records "Data Transfer Start Request" in the update state D1 via the update state managing unit 10003 as a successful command (S404R).

The update control unit 10001 of the gateway 10 then reads, from the update data 5013, the update data corresponding to the block currently being processed. The engine control ECU 13 divides the read update data into data each of a size that can be received at a time, and transmits the resultant data to the engine control ECU 13 (S405). Here, the transmit data is further divided into CAN frames for transmission. The update control unit 13001 of the engine control ECU 13 receives the data transmitted from the gateway 10 in step 405, and then gives an instruction to the differential/compression restore unit 13002 and starts a restore process S407. The restore process S407 will be described below in detail. Here, in a case where the restore process takes much time, the update control unit 13001 of the engine control ECU 13 transmits a standby response to the gateway 10 (S406). When the restore process S407 is completed, the update control unit 13001 of the engine control ECU 13 transmits a reception response S408 to the gateway 10. The gateway 10 and the engine control ECU 13 repeat the process from step S405 to step S408 (transfer process S430) until completion of transfer of all of the update data corresponding to the divided block currently being processed.

When the transfer process 430 is completed, the update control unit 10001 of the gateway 10 records "Data Transfer" in the update state D1 via the update state managing unit 10003 as a successful command (S408R), and transmits a transfer completion notification to the engine control ECU 13 (S409). The update control unit 13001 of the engine control ECU 13 receives the transfer completion notification transmitted from the gateway 10 in step S409, and then gives a data write instruction to the FROM control unit 13004 in step S411. In accordance with this instruction, the FROM control unit 13004 writes the new software or a part of the new software into the FROM 1313, the new software having been restored by the differential/compression restore unit 13002 and temporarily stored in the SRAM 1312 or the FROM 1313. Here, in a case where much time is needed to write the data to the FROM 1313, the FROM control unit 13004 transmits the standby response to the gateway 10 (S410). When succeeding in the write into the FROM 1313, the update control unit 13001 records the written block in the update state D1 via the update state managing unit 13003 as a completely processed block (S411R), and transmits the acceptance response to the gateway 10 (S412).

The update control unit 10001 of the gateway 10 receives the acceptance response transmitted from the engine control ECU 13 in step S412, and then records completion of the rewrite process for the block in the update state D1 via the update state managing unit 10003 (S412R). The gateway 10 and the engine control ECU 13 repeat the process from step S403R to step S412R (block restore and write process S420) until completion of all of the transfer and write processes corresponding to all the blocks to be processed. When the restore and write process S420 is completed on all the blocks to be processed, the update control unit 10001 of the gateway 10 records completion of the rewrite process in the update state D1 via the update state managing unit 10003 (S415R).

The update control unit 10001 of the gateway 10 then transmits the session change request to the engine control ECU 13 (S413). The session change request includes identification information about a normal mode that is used to return to the normal mode. The update control unit 13001 of the engine control ECU 13 receives the session change request transmitted from the gateway 10 in step S413, then causes the internal state to transit to the normal mode specified in the session change request, and subsequently transmits the acceptance response to the gateway 10 (S414).

Sequential recording of the update state as described above allows an appropriate recovery process to be started with the following recognition at the time of normal recovery and activation after abortion of update: the recognition that the update has been aborted rather than completed and the recognition of how far the update has progressed at the time of the abortion.

FIG. 9 is a conceptual diagram illustrating processing of the restore process S407 in the ECU.

Figure 9A:
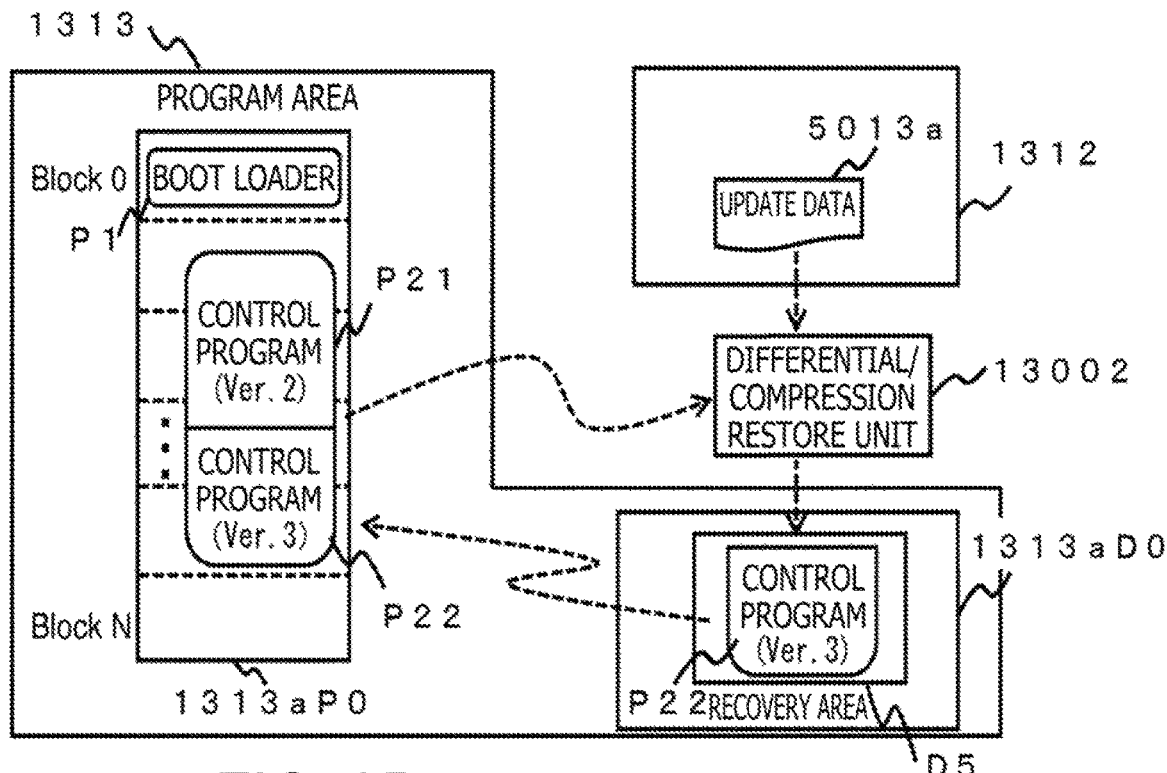
FIG. 9A is a conceptual diagram illustrating processing of a restore process S407 in an ECU with little memory.

FIG. 9(a) is a conceptual diagram illustrating the processing of the restore process S407 in the ECUs with little memory. The differential/compression restore unit 13002 receives a restore instruction from the update control unit 13001 and then reads a part of update data 5013a received from the gateway 10 and stored in the SRAM 1312. For compression update, the update data, which is compressed, is decompressed and output to a restore area D5 as a version 3 control program P22. For differential update, the update data is differential data, and thus, the differential/compression restore unit 13002 first reads a part or all of the current, version 2 control program P21 that is needed for restoration. The differential/compression restore unit 13002 combines the read data together to restore and output the version 3 control program to a restore area D5.

In present embodiment, the restore area D5 is reserved in the Data area 1313aD0 of the FROM 1313. However, the restore area D5 may be reserved in an empty area (BlockN of 1313aP0) of the program area or in the SRAM 1312. In a case where the Data area 1313aD0 of the FROM 1313 or the empty area (BlockN of 1313aP0) of the program area is used as the restore area D5, even when the update is aborted during erasure of the Flash or write to the Flash, the update can be resumed from the middle of the update process. However, depending on specifications of the microcomputer 131, access to the Data area 1313a may take much time, leading to an extended update time. Furthermore, depending on the specifications of the microcomputer 131, empty areas of software may be rewritten only a small number of times. Furthermore, in a case where the SRAM 1312 is utilized as a restore area, the recovery process based on differential resume is prevented from being executed in a case where the update is aborted during a Flash write process S411. In the Flash write process S411 in FIG. 8, the update control unit 13001 overwrites the corresponding area of the FROM 1313 with the restored version 3 control program P22 via the FROM control unit 13004. In FIG. 9(a), the update control unit 13001 and the FROM control unit 13004 are not illustrated.

As described above, sequential restoration of received data allows differential update to be performed without a need to accumulate all differential data needed to reconfigure the version 3 control program P22.

However, in a case where the differential data is small enough to be stored in a surplus area of the memory, the sequential restoration in accordance with the present procedure is not necessarily needed, and the restore process may be started after all of the data is received. However, in both cases, the control program in execution needs to be overwritten, preventing the control program from operating normally in a case where the update is aborted.

Figure 9B:
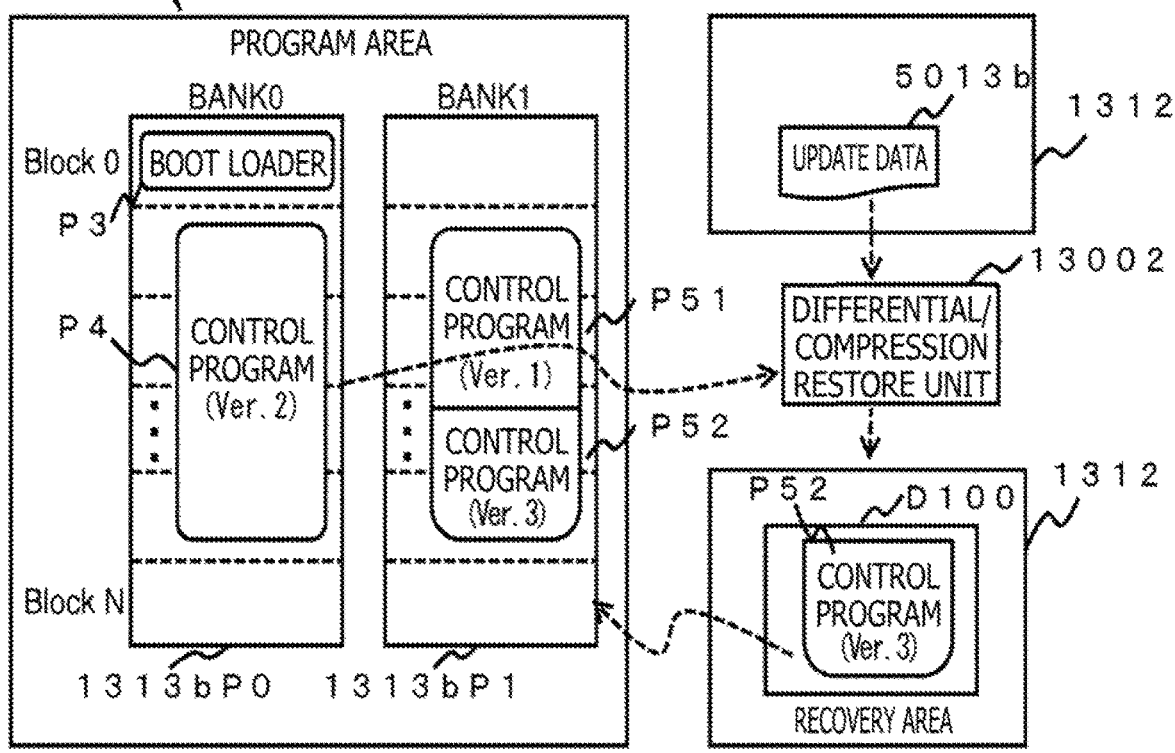
FIG. 9B is a conceptual diagram illustrating processing of a restore process S407 in an ECU with much memory.

FIG. 9(b) is a conceptual diagram illustrating processing of the restore process S407 in the ECUs including much memory. The differential/compression restore unit 13002 receives a restore instruction from the update control unit 13001, and then reads a part 5013b of the update data received from the gateway 10 and stored in the SRAM 1312. For compression update, the update data is compressed software, and is thus decompressed and output to a restore area D100 as a version 3 control program P52. In the present embodiment, the restore area D100 is reserved in the SRAM 1312. For differential update, the update data is differential data, and thus, the differential/compression restore unit 13002 reads a part or all of the current control program P4 that is needed for restoration. The differential/compression restore unit 13002 combines the read data together to restore and output the version 3 control program P52 to the restore area D100. In the Flash write process S411 in FIG. 8, the update control unit 13001 overwrites the corresponding area of the FROM 1313 with the restored new software P52 via the FROM control unit 13004. Here, the version 1 control program P51 in BANK1 is overwritten with the version 3 control program P52. Furthermore, here, the update control unit 13001 and the FROM control unit 13004 are not illustrated.

As described above, in a case where the ECU with memory storing two control programs is updated, a storage area of the control program is duplexed and the control program is restored and stored in an area differing from an area where the control program currently in execution is stored. This allows normal operation to be continued without corrupting the control program in execution even in a case where the update is aborted.

FIG. 10 illustrates an example of an activation sequence for the ECUs.

Figure 10A:
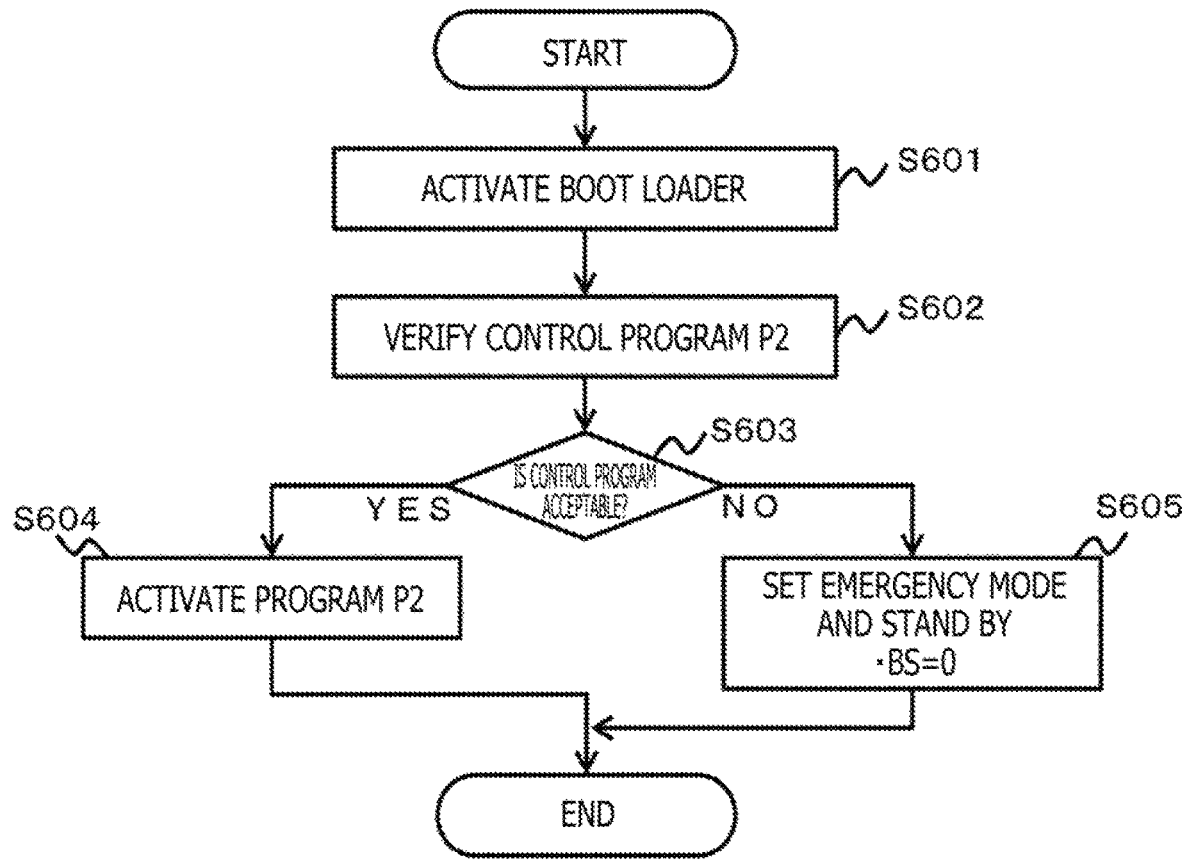
FIG. 10A is an activation sequence diagram of the ECU with little memory.

FIG. 10(a) is a diagram of an activation sequence for the ECUs including little memory.

For the ECUs including little memory, the boot loader P1 is first activated (S601). The boot loader P1 verifies the control program P2 stored in the program area (S602). When the verification results in determination that the control program P2 is acceptable (S603: YES), the control program P2 is activated (S604). Furthermore, when the verification results in determination that the control program P2 is not acceptable, the control program P2 is not executed, an emergency mode is set, and a control instruction from the gateway 10 is waited for (S605). At this time, Block Size may be set to 0, and burst transfer of CAN frames may be performed; Block Size is a transfer parameter defined by ISO15765-2 as a setting specific to the emergency mode. This allows communication to be made efficient. The case where the control program P2 is determined not to be acceptable includes, for example, a case where no software is present and a case where the verification result is abnormal.

Figure 10B:
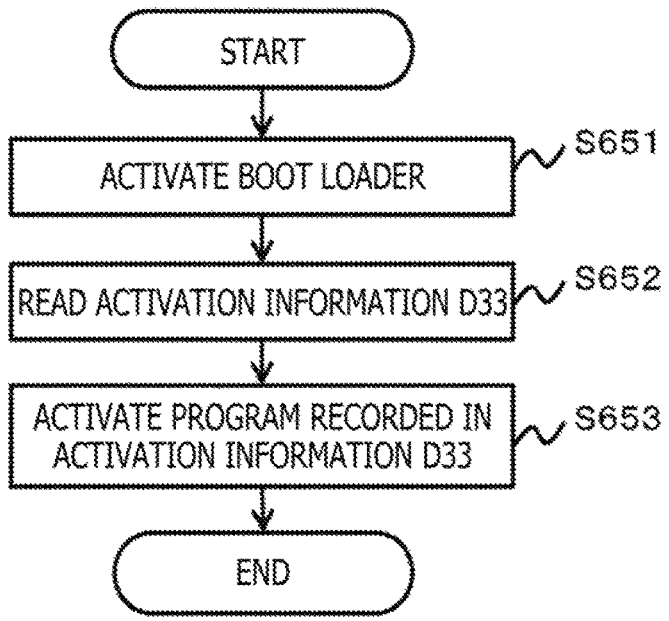
FIG. 10B is an activation sequence diagram of the ECU with much memory.

FIG. 10(b) is a diagram of an activation sequence for the ECUs including much memory.

For the ECUs including much memory, the boot loader P3 is first activated (S651). The boot loader P3 reads the activation information D33 in the parameter D3 in the Data area 1313bD0 (S652), and executes the control program P2 recorded in the activation information D33 (S653). For example, in a case where the activation information D33 is "Program Area 1313bP0," the version 2 control program P4 on the program area 1313bP0 is executed.

Figure 11:
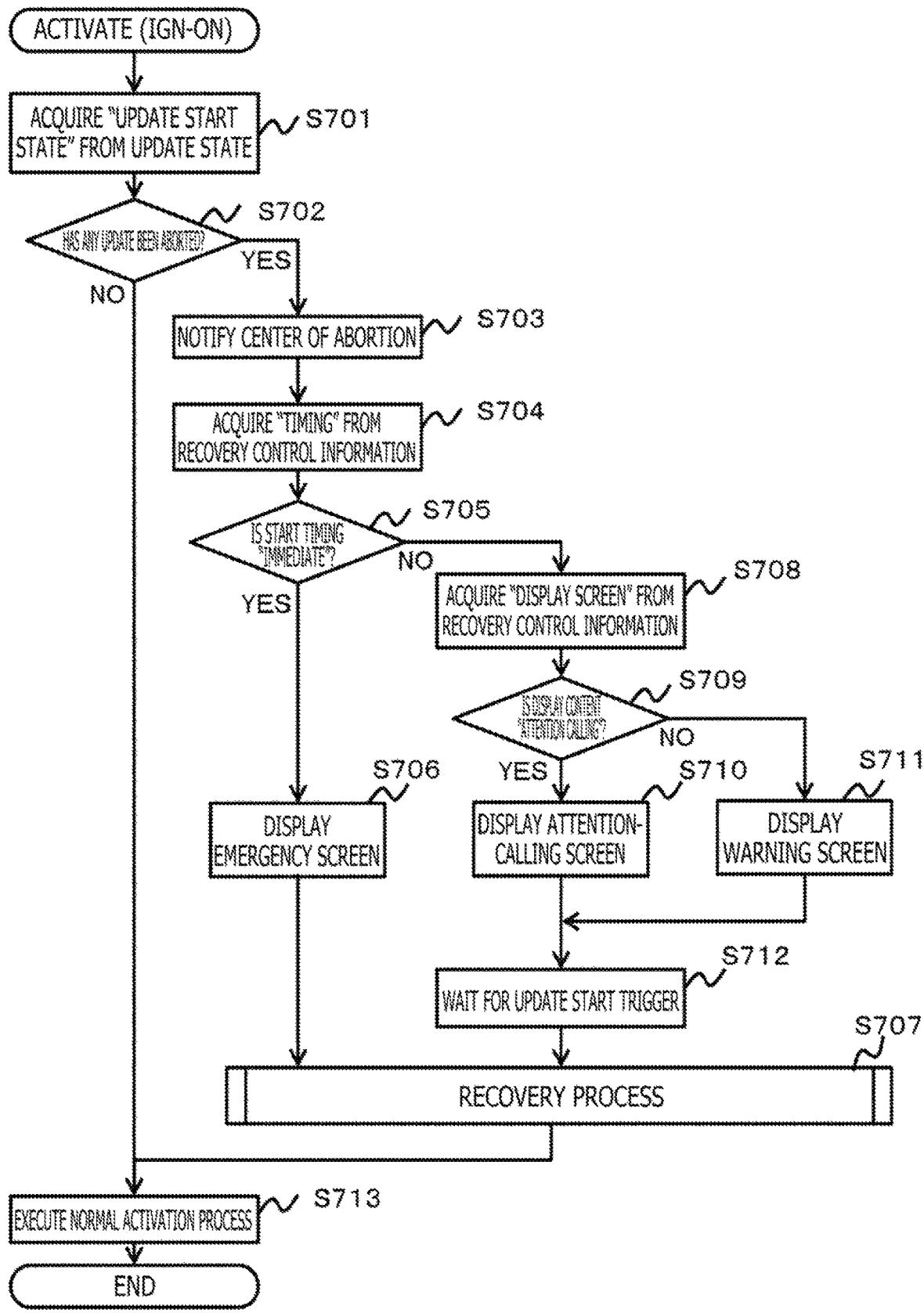
FIG. 11 is a flowchart illustrating a recovery control process executed by a gateway 10 during activation.

FIG. 11 is a flowchart illustrating a recovery control process executed by the gateway 10 during activation.

When the gateway 10 is activated, the recovery control unit 10004 of the gateway 10 acquires, via the update state managing unit 10003, the update start state D102 recorded in the update state D1 (S701). In a case of determining that no ECU is present for which update has been started, that is, that no update has been aborted (S702: NO), the recovery control unit 10004 executes a normal process of activating the gateway 10.

In a case of determining that an ECU is present for which update has been started, that is, certain update has been aborted (S702: YES), the recovery control unit 10004 notifies the server 2 of the presence of aborted update (S703). The recovery control unit 10004 then acquires a start timing 50212 via the recovery control information managing unit 10005 from the ECU recovery control information 5021 corresponding to the ECU ID (S704).

In a case of determining that the start timing 50212 is "Immediate" (S705: YES), the recovery control unit 10004 outputs a command causing the HMI 12 to display an "Emergency" screen (S706) to start the recovery process (S707) in accordance with the display contents 50213 of the recovery control information 5021. However, in this case, in order to start the recovery process as soon as possible, the command may be output to the HMI 12 after the recovery process is started or the two processes may be executed at the same time. The recovery process S707 will be described below in detail.

In a case where the start timing 50212 is other than "Immediate," the recovery control unit 10004 acquires the display content 50213 from the recovery control information 502 (S708). In a case of determining the display content to be "Attention Calling," the recovery control unit 10004 requests the HMI 12 to display an "Attention Calling" screen (S710).

On the other hand, in a case of determining the display content to be "Warning," the recovery control unit 10004 requests the HMI 12 to display a "Warning" screen (S711). After transmitting the screen display request, the recovery control unit 10004 waits for an update start trigger such as traveling start, IGN-OFF, or the like (S712). When subsequently detecting occurrence of a trigger event for update start, the recovery control unit 10004 starts the recovery process (S707). When the recovery process S707 is completed, the recovery control unit 10004 executes a normal activation process (S713).

Figure 12:
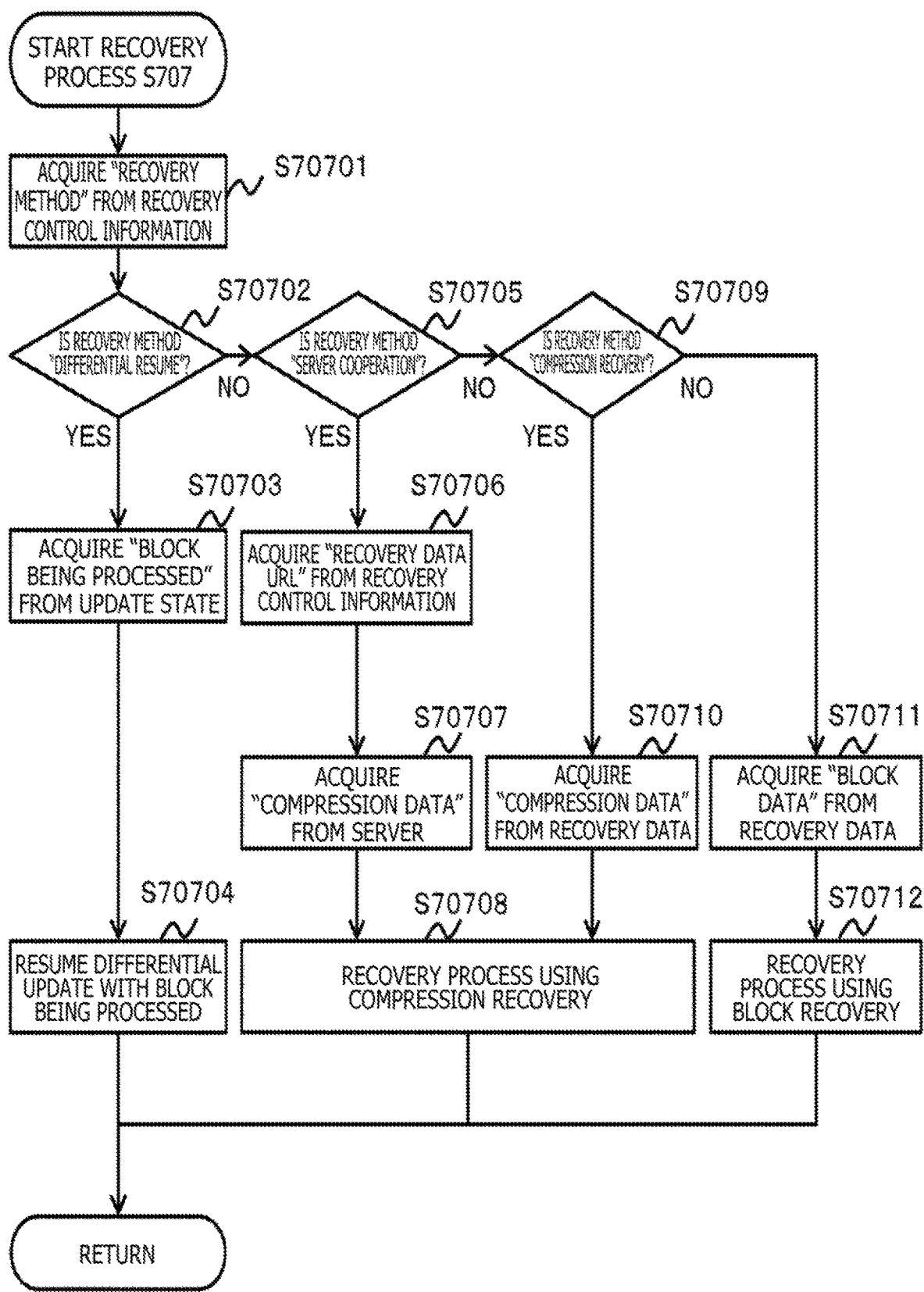
FIG. 12 is a flowchart illustrating an example of a recovery process S707.

FIG. 12 is a flowchart illustrating an example of the recovery process S707 in the first embodiment.

The recovery control unit 10004 of the gateway 10 acquires the recovery method 50214 via the recovery control information managing unit 10005 from the recovery control information 5021 corresponding to the ECU ID (S70701), and proceeds to step S70702.

In a case of determining the recovery method 50214 to be "Differential Resume" (S70702: YES), the recovery control unit 10004 acquires, via the update state managing unit 10003, the block being processed recorded in the update state D1 (S70703), and resumes the differential update process on the ECU at this block (S70704).

In a case of determining the recovery method 50214 not to be "Differential Resume" (S70702: NO), the recovery control unit 10004 determines whether or not the recovery method 50214 is "Server Cooperation." In a case of determining the recovery method 50214 to be "Server Cooperation" (S70705: YES), the recovery control unit 10004 acquires the recovery data URI 50215 via the recovery control information managing unit 10005 from the recovery control information 5021 corresponding to the ECU ID (S70706), and acquires compressed data from the URI as recovery data (S70707).

In a case of determining the recovery method 50214 not to be "Server Cooperation" (S70705: NO), the recovery control unit 10004 determines whether or not the recovery method 50214 is "Compression Recovery." In a case of determining the recovery method 50214 to be "Compression Recovery" (S70709: YES), the recovery control unit 10004 acquires the compressed data via the recovery control information managing unit 10005 from the ECU recovery data 5022 corresponding to the ECU ID (S70710).

After acquiring the compressed data in step S70707 or S70710, the recovery control unit 10004 uses the acquired compressed data to execute the recovery process on the ECU (S70708).

In a case of determining the recovery method 50214 not to be "Compression Recovery" (S70709: NO), the recovery control unit 10004 acquires the block XOR data via the recovery control information managing unit 10005 from the ECU recovery data 5022 corresponding to the ECU ID (S70711), and executes, on the ECU, the recovery process based on block recovery (S70712).

As described above, the recovery control process used when an abnormality in update occurs is executed on the basis of the recovery control information 502 transmitted from the server 2 as the update package 5 along with the update control information 501. Thus, even in a case where an abnormality in update occurs in a system consisting of a large number of ECUs with different resources and characteristics, recovery can be started at an appropriate timing according to the effect of the abnormality in update on the vehicle system. The effect of the update abortion on the system can be accurately communicated to the user. The recovery process can be executed using the recovery sequence corresponding to the characteristics of the ECU to be updated. This allows the software to be normally updated.

Operation Example

For the self-driving ECU 15, the ADAS ECU 16, the engine control ECU 13, the brake control ECU 14, the HVAC ECU 18, and the airbag ECU 17, examples of operations, in the recovery process, of these ECUs will be described below using FIG. 13 to FIG. 24.

Operation Example—Self-Driving ECU

Figures 13A, 13B, 13C:
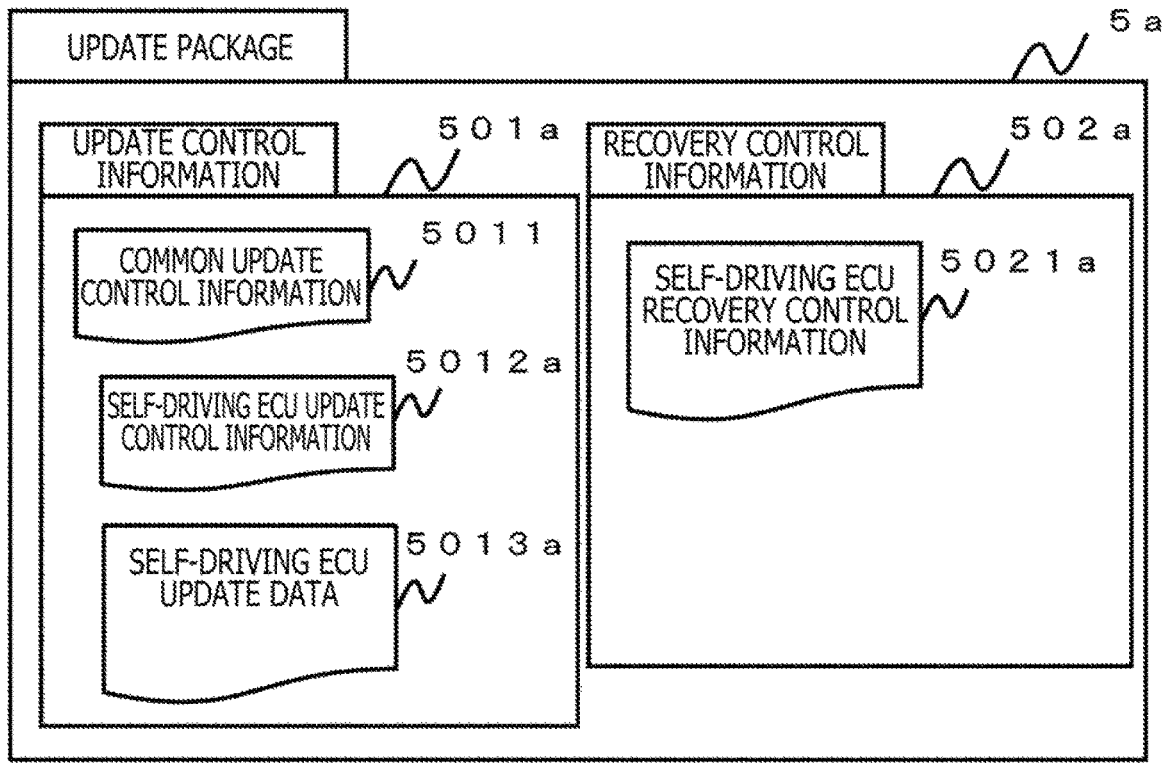
FIG. 13A and FIG. 13B are diagrams illustrating an example of an update package corresponding to a self-driving ECU.
FIG. 13C is a diagram illustrating an example of screen display.
Figure 14:
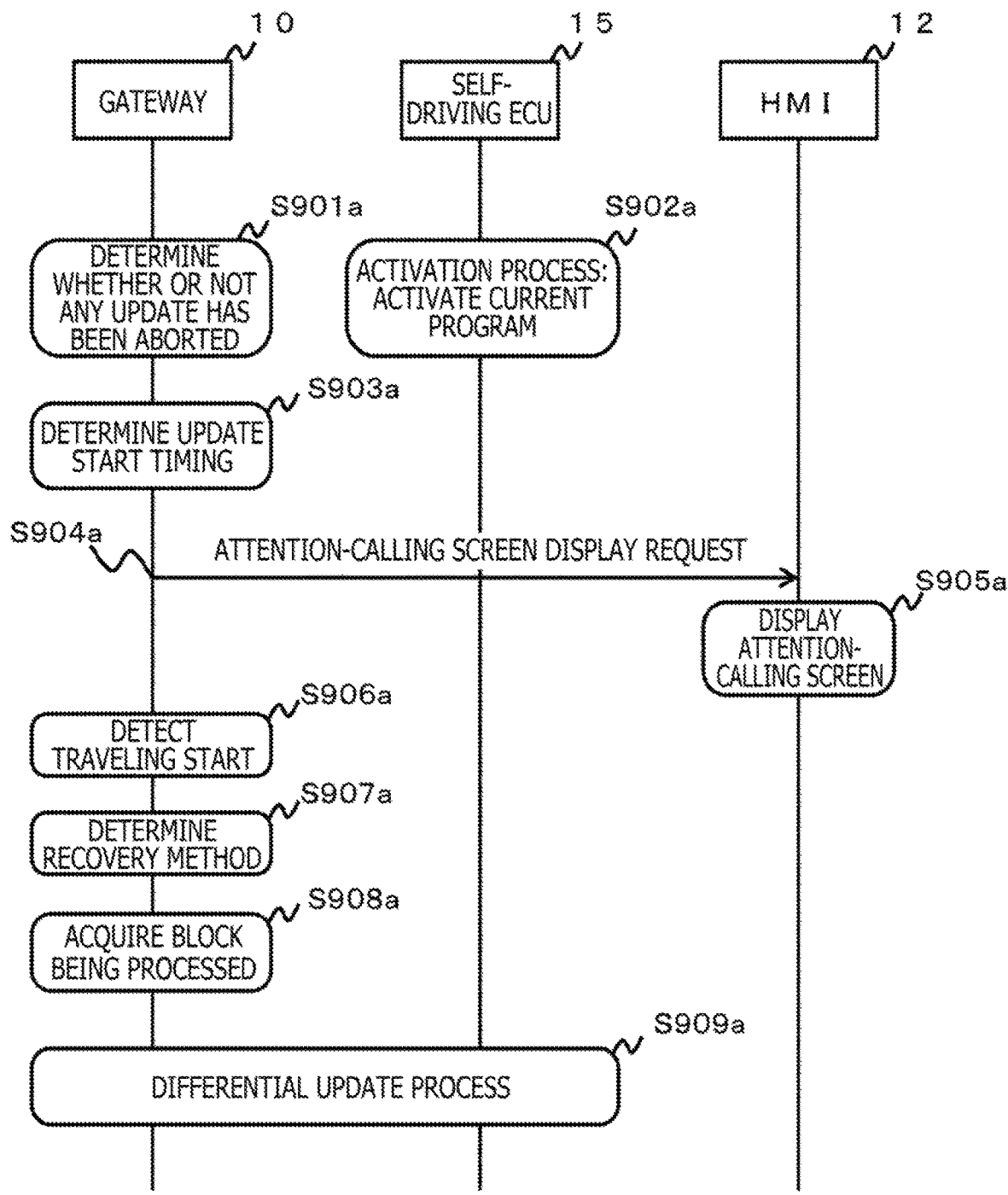
FIG. 14 is a sequence diagram illustrating an example of a recovery process of the self-driving ECU.

FIG. 13 and FIG. 14 will be used to describe a configuration of an update package 5a corresponding to the self-driving ECU 15, an example of display on the HMI 12, and an operation sequence.

FIG. 13(a) is a diagram illustrating a configuration of the update package 5a in a case where only the self-driving ECU 15 is to be updated, FIG. 13(b) is a diagram illustrating a configuration of self-driving ECU recovery control information 5021a included in the update package 5a, and FIG. 13(c) is a diagram illustrating an example of display on the HMI 12 based on the self-driving ECU recovery control information 5021a.

The update package 5a for the case where only the self-driving ECU 15 is to be updated is composed of update control information 501a including the common update control information 5011, self-driving ECU update control information 5012a, and self-driving ECU update data 5013a, and recovery control information 502a including self-driving ECU recovery control information 5021a, as illustrated in FIG. 13(a).

In the self-driving ECU recovery control information 5021a, as illustrated in FIG. 13(b), "Self-Driving ECU" is set in an ECU ID 50211a, and "Traveling Start" is set in a start timing 50212a. "Attention Calling" and unillustrated display message information are set in a display content 50213a. "Differential Resume" is set in a recovery method 50214a, and "NULL" meaning setting of no information is set in a recovery data URI 50215a.

The recovery control unit 10004 causes the display device of the HMI 12 to output screen display G10a illustrated in FIG. 13(c) on the basis of the display content 50213a. The screen display G10a corresponds to attention calling notifying the user that the update of the software has been aborted and that the vehicle 1 is in a function limited state due to the recovery process, and thus the updated functions are not enabled yet, the attention calling also indicating that the aborted update is automatically applied.

FIG. 14 is a sequence diagram illustrating an example of the recovery process for the self-driving ECU 15. For example, when the update process for the self-driving ECU 15 is aborted by, for example, shutdown of power supply to the gateway 10 and then the power supply is resumed, the recovery process is executed as described below. The self-driving ECU 15 is classified as an ECU including much memory, and can store two control programs as illustrated in FIG. 5(b).

When activated, the gateway 10 starts a process illustrated in FIG. 11. That is, in step S901a, the gateway 10 first checks whether or not any update has been aborted (S701, S702 in FIG. 11, S901a in FIG. 14).

Furthermore, in parallel with the process of the gateway 10, the self-driving ECU 15 executes the activation process illustrated in FIG. 10(b). Here, the update has been aborted, the activation information D33 has not been rewritten yet, and activation of the control program recorded in the program area 1313bP0 is specified. Thus, the self-driving ECU 15 activates the current, version 2 control program P4.

The gateway 10 determines, from the update start state D102 of the update state D 21, that the update of the self-driving ECU 15 has been aborted (S901a), and executes the following process in step S903a. That is, the gateway 10 reads the start timing 50212a from the self-driving ECU recovery control information 5021a corresponding to the self-driving ECU 15 to determine that the recovery process for the self-driving ECU 15 is to be started at a timing after traveling is started.

Then in step S904a, the gateway 10 reads the display content 50213a from the self-driving ECU recovery control information 5021a to issue, to the HMI 12, a request for display of the attention calling screen based on the display content 50213a. On the basis of the request, the HMI 12 displays, on the display device, the attention calling screen illustrated at G10a in FIG. 13(c) (S905a). The gateway 10 detects, in step S906a, traveling start that is a trigger to start the recovery process, and reads the recovery method 50214a from the self-driving ECU recovery control information 5021a to determine the method for the recovery process to be "Differential Resume" (S907a). As described above, the recovery based on "Differential Resume" refers to a method in which, in a case where differential update is aborted, the differential update is resumed at the aborted block to allow the update to be completed in a short time. The gateway 10 reads the block being processed D103 from the update state D21 in order to determine a point where operation is to be started (S908a). The gateway 10 determines a block for which the operation is to be started, and then in step 909a, starts executing the software update process S4 in FIG. 8 at this block, completing the update of the self-driving ECU 15.

In a case where ample memory is provided as in the self-driving ECU 15 and the control program can be duplexed, the updated control program can be restored and stored in an area differing from an area where the control program in execution is stored. This provides the following advantage. That is, the control program in execution is not corrupted even in a case where the update is aborted, and the control program in execution is activated during reactivation to allow normal operations to be maintained. Thus, in a case where the recovery control information 502a is configured as described above and the thus configured recovery control information 502a is used, the gateway 10 need not immediately complete updating the self-driving ECU 15 even in a case where the update is aborted. In this case, resuming the update during the next traveling suffices.

The gateway 10 causes the HMI 12 to display the attention calling screen to inform the user that the update has been aborted and that the update is automatically resumed during traveling. Furthermore, since the update state is recorded in the update state D1, execution of recovery can be started at the abortion point, that is, the update can be resumed and expeditiously completed.

In the above-described example, the example is illustrated in which the attention calling screen is displayed when the update of the self-driving ECU 15 is aborted. However, in a case where, for example, the update of the self-driving ECU 15 is performed completely in a background during traveling or the like and completed while the user is unconscious of the update, the attention calling screen may be controllably prevented from being displayed. In this case, instead of "Attention Calling," "No Screen Display" is set in the display content 50213a in FIG. 13.

Operation Example—ADAS ECU

Figure 15:
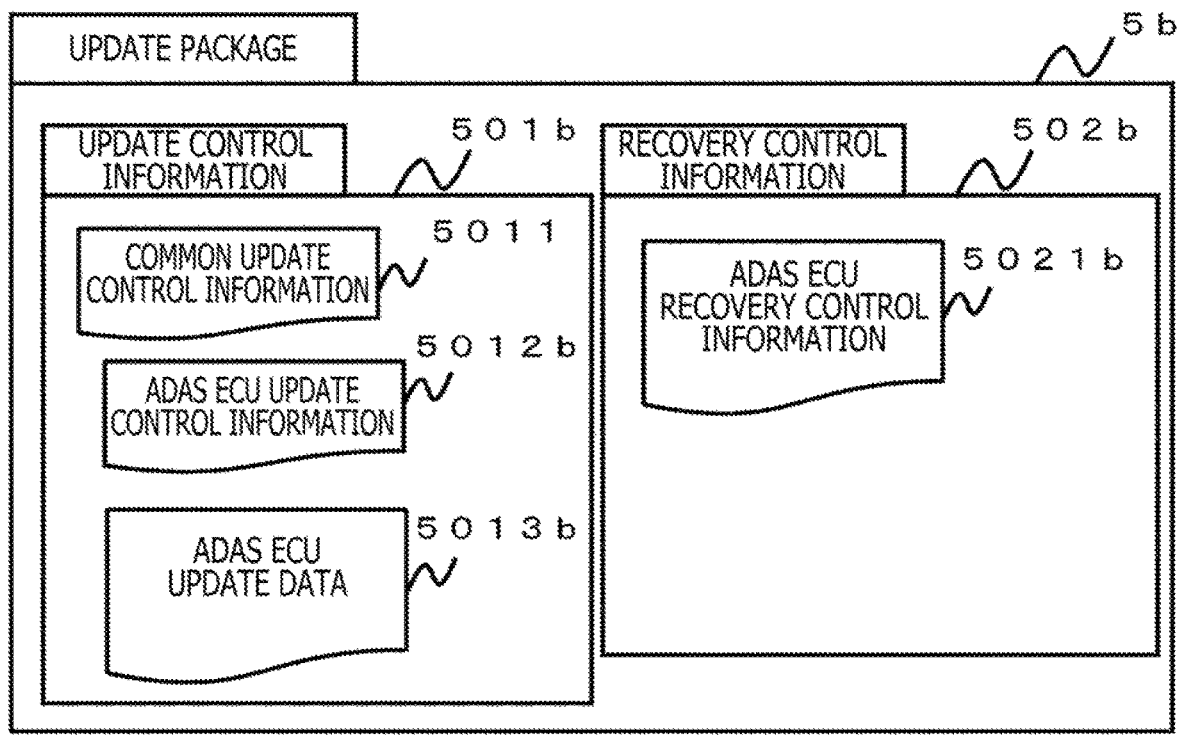
FIG. 15A and FIG. 15B are diagrams illustrating an example of an update package corresponding to an ADAS ECU.
FIG. 15C is a diagram illustrating an example of screen display.
Figure 16:
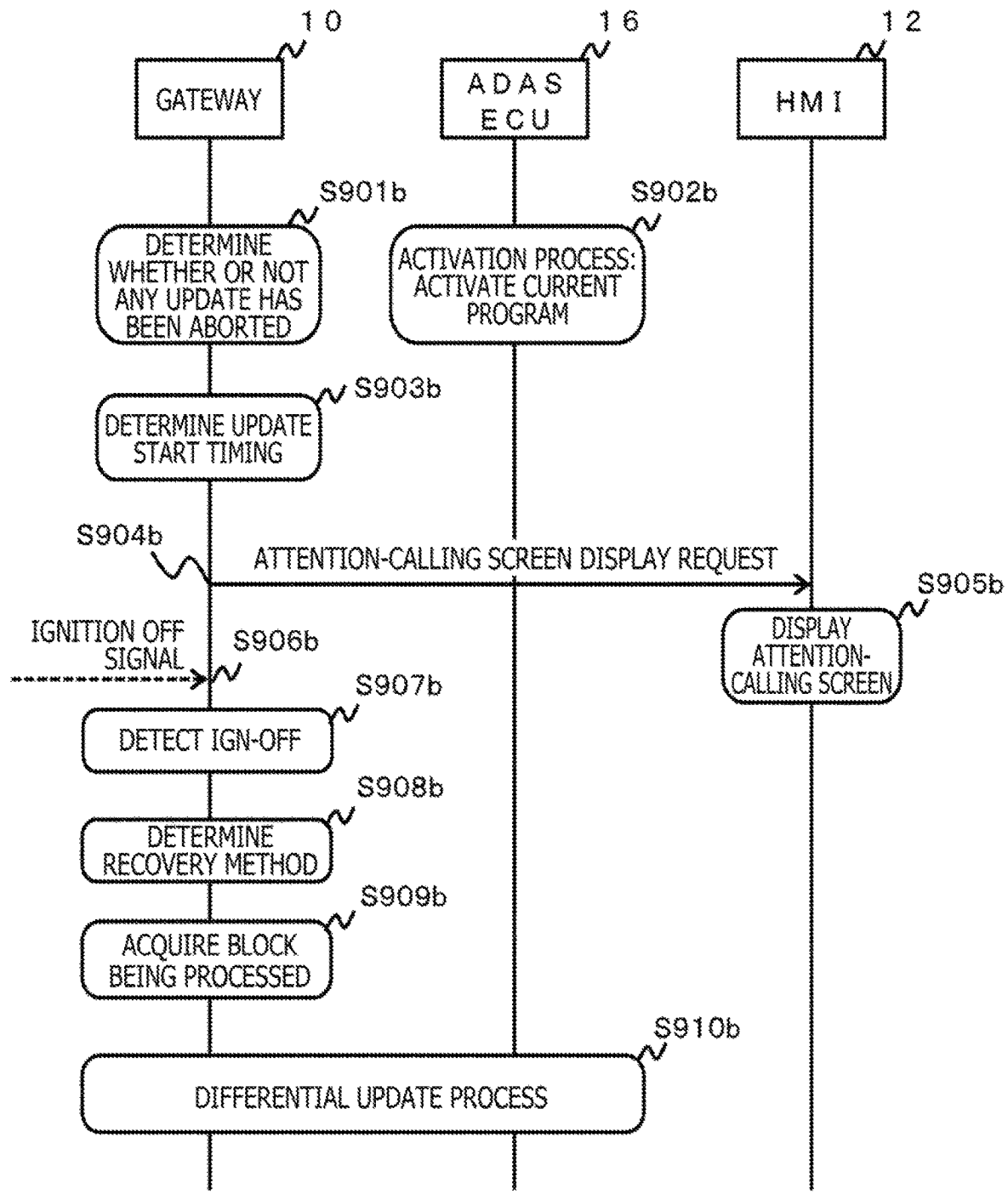
FIG. 16 is a sequence diagram illustrating an example of a recovery process of the ADAS ECU.

FIG. 15 and FIG. 16 will be used to describe a configuration of an update package 5b corresponding to the ADAS ECU 16, an example of display on the HMI 12, and an operation sequence.

FIG. 15(a) is a diagram illustrating a configuration of the update package 5b in a case where only the ADAS ECU 16 is to be updated, FIG. 15(b) is a diagram illustrating a configuration of ADAS ECU recovery control information 5021b included in the update package 5b, and FIG. 15(c) is a diagram illustrating an example of display on the HMI 12 based on the ADAS ECU recovery control information 5021b.

The update package 5b for the case where only the ADAS ECU 16 is to be updated is composed of update control information 501b including the common update control information 5011, ADAS ECU update control information 5012b, and ADAS ECU update data 5013b, and recovery control information 502b including ADAS ECU recovery control information 5021b, as illustrated in FIG. 15(a).

In the ADAS ECU recovery control information 5021b, as illustrated in FIG. 15(b), "ADAS ECU" is set in an ECU ID 50211b, and "IGN-OFF" is set in a start timing 50212b. "Attention Calling" and unillustrated display message information are set in a display content 50213b. "Differential Resume" is set in a recovery method 50214b, and "NULL" meaning setting of no information is set in a recovery data URI 50215b.

The recovery control unit 10004 causes the display device of the HMI 12 to output screen display G10b illustrated in FIG. 15(c), on the basis of the display content 50213b. The screen display G10b corresponds to attention calling notifying the user that the update of the software has been aborted and that the vehicle 1 is in the function limited state due to the recovery process, and thus the updated functions are not enabled yet, the attention calling also indicating that the aborted update is applied at a subsequent timing of IGN-OFF, that is, at a timing when the ignition is turned off.

FIG. 16 is a sequence diagram illustrating an example of the recovery process for the ADAS ECU 16. For example, when the update process for the ADAS ECU 16 is aborted by, for example, shutdown of power supply to the gateway 10 and then the power supply is resumed, the recovery process is executed as described below. The ADAS ECU 16 is classified as an ECU including much memory, and can store two control programs as illustrated in FIG. 5(b).

When activated, the gateway 10 starts the process illustrated in FIG. 11. That is, in step S901b, the gateway 10 first checks whether or not any update has been aborted (S701, S702 in FIG. 11, S901b in FIG. 16).

Furthermore, in parallel with the process of the gateway 10, the ADAS ECU 16 executes the activation process illustrated in FIG. 10(b). Here, the update has been aborted, the activation information D33 has not been rewritten yet, and activation of the control program recorded in the program area 1313bP0 is specified. Thus, the ADAS ECU 16 activates the current, version 2 control program P4.

The gateway 10 determines, from the update start state D102 of the update state D21, that the update of the ADAS ECU 16 has been aborted (S901b), and executes the following process in step S903b. That is, the gateway 10 reads the start timing 50212b from the ADAS ECU recovery control information 5021b corresponding to the ADAS ECU 16 to determine that the recovery process for the ADAS ECU 16 is to be started at the timing of IGN-OFF.

Then in step S904b, the gateway 10 reads the display content 50213b from the ADAS ECU recovery control information 5021b to issue, to the HMI 12, a request for display of the attention calling screen based on the display content 50213b. On the basis of the request, the HMI 12 displays, on the display device, the attention calling screen illustrated at G10b in FIG. 15(c) (S905b). The gateway 10 receives, from the vehicle 1, an ignition OFF signal that is a trigger to start the recovery process in step S906b, then detects the ignition OFF signal (S907b), and reads the recovery method 50214b from the ADAS ECU recovery control information 5021b to determine the method for the recovery process to be "Differential Resume" (S908b). As described above, the recovery based on "Differential Resume" refers to a method in which, in a case where differential update is aborted, the differential update is resumed at the aborted block to allow the update to be completed in a short time. The gateway 10 reads the block being processed D103 from the update state D21 in order to determine a point where operation is to be started (S909b). The gateway 10 determines a block for which the operation is to be started, and then in step 910b, starts executing the software update process S4 in FIG. 8 at this block, completing the update of the ADAS ECU 16.

Like the self-driving ECU 15, the ADAS ECU 16 includes ample memory and thus has advantages similar to the advantages of the self-driving ECU 15.

The gateway 10 causes the HMI 12 to display the attention calling screen to inform the user that the update has been aborted and that the aborted update is resumed by ignition off. Furthermore, since the update state is recorded in the update state D1, execution of recovery can be started at the abortion point, that is, the update can be resumed and expeditiously completed.

Operation Example—Engine Control ECU

FIG. 17 and FIG. 18 will be used to describe a configuration of an update package 5c corresponding to the engine control ECU 13, an example of display on the HMI 12, and an operation sequence.

FIG. 17(a) is a diagram illustrating a configuration of the update package 5c in a case where only the engine control ECU 13 is to be updated, FIG. 17(b) is a diagram illustrating a configuration of engine control ECU recovery control information 5021c included in the update package 5c, and FIG. 17(c) is a diagram illustrating an example of display on the HMI 12 based on the engine control ECU recovery control information 5021c.

The update package 5c for the case where only the engine control ECU 13 is to be updated is composed of update control information 501c including the common update control information 5011, engine control ECU update control information 5012c, and engine control ECU update data 5013c, and recovery control information 502c including engine control ECU recovery control information 5021c, as illustrated in FIG. 17(a).

In the engine control ECU recovery control information 5021c, as illustrated in FIG. 17(b), "engine control ECU" is set in an ECU ID 50211c, and "Immediate" is set in a start timing 50212c. "Emergency" and unillustrated display message information are set in a display content 50213c. "Differential Resume" is set in a recovery method 50214c, and "NULL" meaning setting of no information is set in a recovery data URI 50215c.

The recovery control unit 10004 causes the display device of the HMI 12 to output screen display G10c illustrated in FIG. 17(c) on the basis of the display content 50213c. The screen display G10c notifies the user that the update of the software has been aborted and that the vehicle 1 is in the function limited state due to the recovery process, and thus the vehicle 1 is disabled, and the screen display G10c indicates that the aborted update is being immediately recovered.

FIG. 18 is a sequence diagram illustrating an example of the recovery process for the engine control ECU 13. For example, when the update process for the engine control ECU 13 is aborted by, for example, shutdown of power supply to the gateway 10 and then the power supply is resumed, the recovery process is executed as described below. The engine control ECU 13 is classified as an ECU including little memory, and can store only one control program as illustrated in FIG. 5(a).

When activated, the gateway 10 starts the process illustrated in FIG. 11. That is, in step S901c, the gateway 10 first checks whether or not any update has been aborted (S701, S702 in FIG. 11, S901c in FIG. 18).

Furthermore, in parallel with the process of the gateway 10, the engine control ECU 13 executes the activation process illustrated in FIG. 10(a). Here, the update has been aborted, and a part of the current, version 2 control program has been overwritten with a part of the version 3 control program, leading to a problem with verification of the control program P2. The engine control ECU 13 is thus activated in the emergency mode (S902c).

The gateway 10 determines, from the update start state D102 of the update state D21, that the update of the engine control ECU 13 has been aborted (S901c), and executes the following process in step S903c. That is, the gateway 10 reads the start timing 50212c from the engine control ECU recovery control information 5021c corresponding to the engine control ECU 13 to determine that the recovery process for the engine control ECU 13 is to be started at an immediate timing.

Then in step S904c, the gateway 10 reads the display content 50213c from the engine control ECU recovery control information 5021c to issue, to the HMI 12, a request for display of the attention calling screen based on the display content 50213c. On the basis of the request, the HMI 12 displays, on the display device, the emergency screen illustrated at G10c in FIG. 17(c) (S905c). Since the recovery process is to be started at an immediate timing, the gateway 10, immediately after issuing, to the HMI 12 in step S904c, the request for display of the emergency screen, reads the recovery method 50214c from the engine control ECU recovery control information 5021c to determine the method for the recovery process to be "Differential Resume" (S906c). The gateway 10 reads the block being processed in D103 from the update state D21 in order to determine, in step S907c, a point where operation is to be started. The gateway 10 determines a block for which the operation is to be started, and then in step 908c, starts executing the software update process S4 in FIG. 8 at this block, completing the update of the engine control ECU 13.

The ECUs such as the engine control ECU 13 which include little memory need to be updated with a single control program being overwritten. Thus, abortion of the update precludes normal operation of the control program. Accordingly, in a case where the update of the engine control ECU 13 is aborted, engine control is prevented from being performed, precluding traveling. In a case where the recovery control information 502c is configured as described above and the thus configured recovery control information 502c is used, when the update of the engine control ECU 13 is aborted, the gateway 10 determines that the aborted update needs to be immediately resumed. Furthermore, the gateway 10 causes the HMI 12 to display the emergency screen to inform the user that the vehicle has been disabled and that resumption of the aborted update has been immediately started. Furthermore, since the update state is recorded in the update state D1, execution of recovery can be started at the abortion point, that is, the update can be resumed and expeditiously completed.

Operation Example—Brake Control ECU

Figures 19A, 19B, 19C:
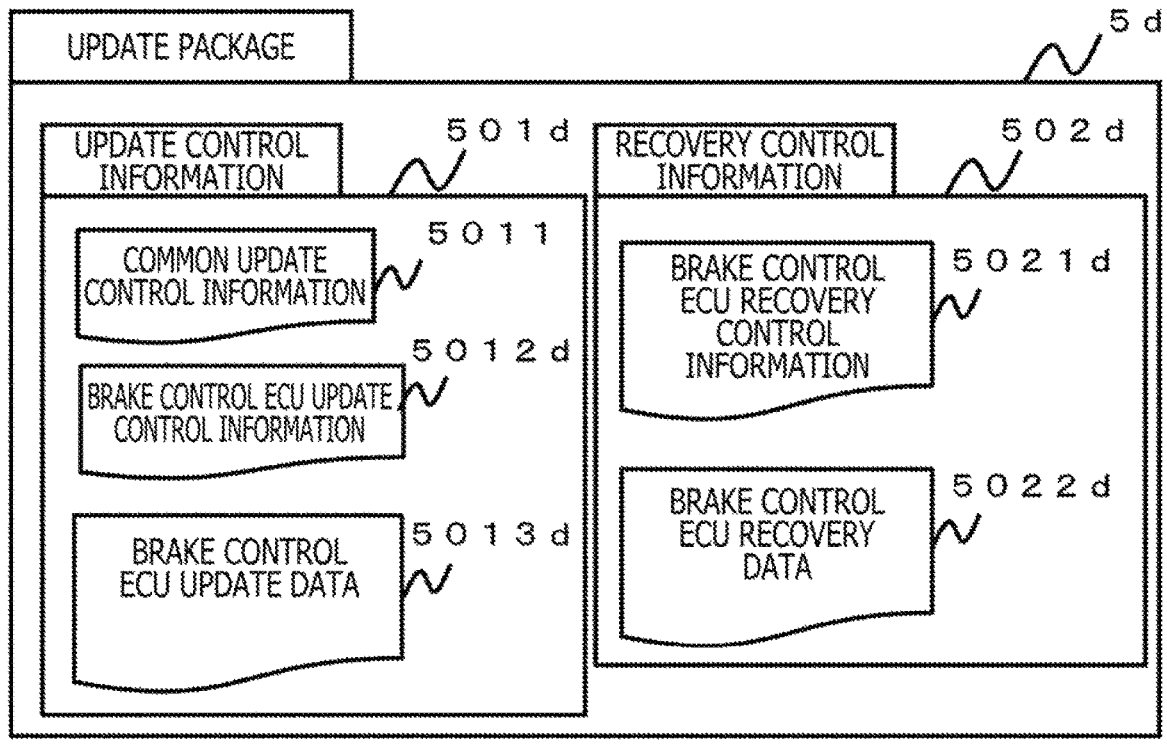
FIG. 19A and FIG. 19B are diagrams illustrating an example of an update package corresponding to a brake control ECU.
FIG. 19C is a diagram illustrating an example of screen display.
Figure 20:
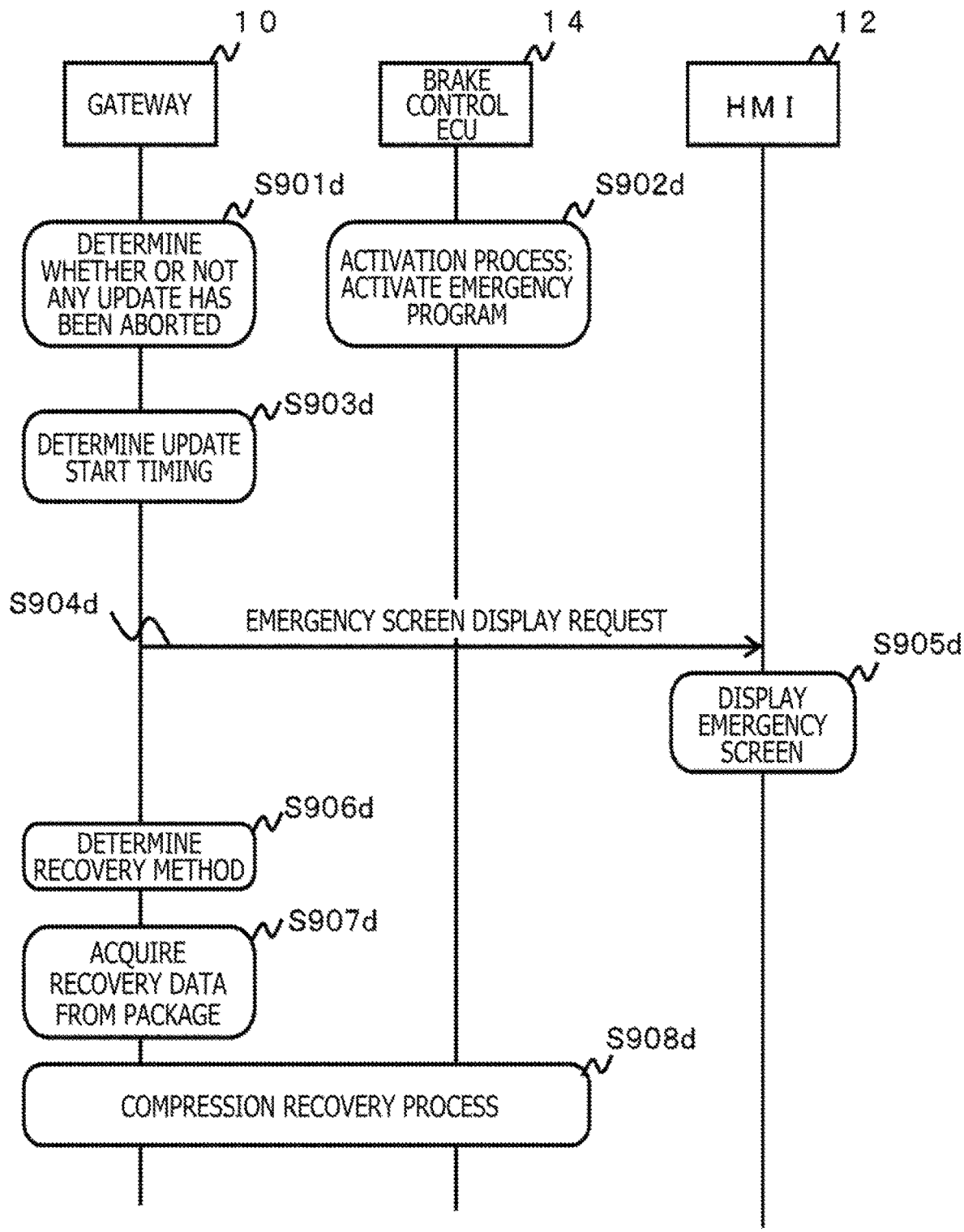
FIG. 20 is a sequence diagram illustrating an example of a recovery process of the brake control ECU.

FIG. 19 and FIG. 20 will be used to describe a configuration of an update package 5d corresponding to the brake control ECU 14, an example of display on the HMI 12, and an operation sequence.

FIG. 19(a) is a diagram illustrating a configuration of the update package 5d in a case where only the brake control ECU 14 is to be updated, FIG. 19(b) is a diagram illustrating a configuration of brake control ECU recovery control information 5021d included in the update package 5d, and FIG. 19(c) is a diagram illustrating an example of display on the HMI 12 based on the brake control ECU recovery control information 5021d.

The update package 5d for the case where only the brake control ECU 14 is to be updated is composed of update control information 501d including the common update control information 5011, brake control ECU update control information 5012d, and brake control ECU update data 5013d, and recovery control information 502d including brake control ECU recovery control information 5021d and brake control ECU recovery data 5022d, as illustrated in FIG. 19(a).

In the brake control ECU recovery control information 5021d, as illustrated in FIG. 19(b), "brake control ECU" is set in an ECU ID 50211d, and "Immediate" is set in a start timing 50212d. "Emergency" and unillustrated display message information are set in a display content 50213d. "Compression Recovery" is set in a recovery method 50214d, and "NULL" meaning setting of no information is set in a recovery data URI 50215d.

The recovery control unit 10004 causes the display device of the HMI 12 to output screen display G10d illustrated in FIG. 19(c) on the basis of the display content 50213d. The screen display G10d notifies the user that the update of the software has been aborted and that the vehicle 1 is in the function limited state due to the recovery process, and thus the vehicle 1 is disabled, and the screen display G10d indicates that the aborted update is being immediately recovered.

FIG. 20 is a sequence diagram illustrating an example of the recovery process for the brake control ECU 14. For example, when the update process for the brake control ECU 14 is aborted by, for example, shutdown of power supply to the gateway 10 and then the power supply is resumed, the recovery process is executed as described below. The brake control ECU 14 is classified as an ECU including little memory, and can store only one control program as illustrated in FIG. 5(a).

When activated, the gateway 10 starts the process illustrated in FIG. 11. That is, in step S901d, the gateway 10 first checks whether or not any update has been aborted (S701, S702 in FIG. 11, S901d in FIG. 20).

Furthermore, in parallel with the process of the gateway 10, the brake control ECU 14 executes the activation process illustrated in FIG. 10(a). Here, the update has been aborted, and a part of the current, version 2 control program has been overwritten with a part of the version 3 control program, leading to a problem with verification of the control program P2. The brake control ECU 14 is thus activated in the emergency mode (S902d).

The gateway 10 determines, from the update start state D102 of the update state D21, that the update of the brake control ECU 14 has been aborted (S901d), and executes the following process in step S903d. That is, the gateway 10 reads the start timing 50212d from the brake control ECU recovery control information 5021d corresponding to the brake control ECU 14 to determine that the recovery process for the brake control ECU 14 is to be started at an immediate timing.

Then in step S904d, the gateway 10 reads the display content 50213d from the brake control ECU recovery control information 5021d to issue, to the HMI 12, a request for display of the emergency screen based on the display content 50213d. On the basis of the request, the HMI 12 displays, on the display device, the emergency screen illustrated at G10d in FIG. 19(c) (S905c). Since the recovery process is to be started at an immediate timing, the gateway 10, immediately after issuing, to the HMI 12 in step S904d, the request for display of the emergency screen, reads the recovery method 50214d from the brake control ECU recovery control information 5021d to determine the method for the recovery process to be "Compression Recovery" (S906d). As described above, the recovery based on "Compression Recovery" refers to a method of reliably achieving recovery by using compressed data of software to execute write to the entire area of the software or to a corrupted area of the software, that is, to repair the corrupted area. In step S907d, the gateway 10 reads the brake control ECU recovery data 5022d that is compressed data of the version 3 control program packaged in the update package 5d. The gateway 10 then uses the read brake control ECU recovery data 5022d to execute the software update process S4 in FIG. 8, thus completing the update of the brake control ECU 14.

Like the engine control ECU 13, the brake control ECU 14 includes little memory. Thus, in a case where the recovery control information 502c is configured as described above and the thus configured recovery control information 502c is used, when the update of the brake control ECU 14 is aborted, the gateway 10 determines that the aborted update needs to be immediately resumed. Furthermore, the gateway 10 causes the HMI 12 to display the emergency screen to inform the user that the vehicle has been disabled and that resumption of the aborted update has been immediately started. Moreover, in a case where compressed data of the version 3 control program is packaged as the brake control ECU recovery data 5022d to repair the control program, the following problems about differential resume can be avoided. That is, differential resume poses problems in that use of the Data area 1313a as a restore area leads to an extended processing time and in that the program area used can possibly be rewritten only a few times. However, the compression recovery method allows these problems to be avoided. Furthermore, in a case where abortion occurs again during repairs of software for the ECU, the block recovery descried below fails to achieve the subsequent restoration. However, repair with compressed data enables re-abortion to be dealt with.

Operation Example—HVAC ECU

Figure 22:
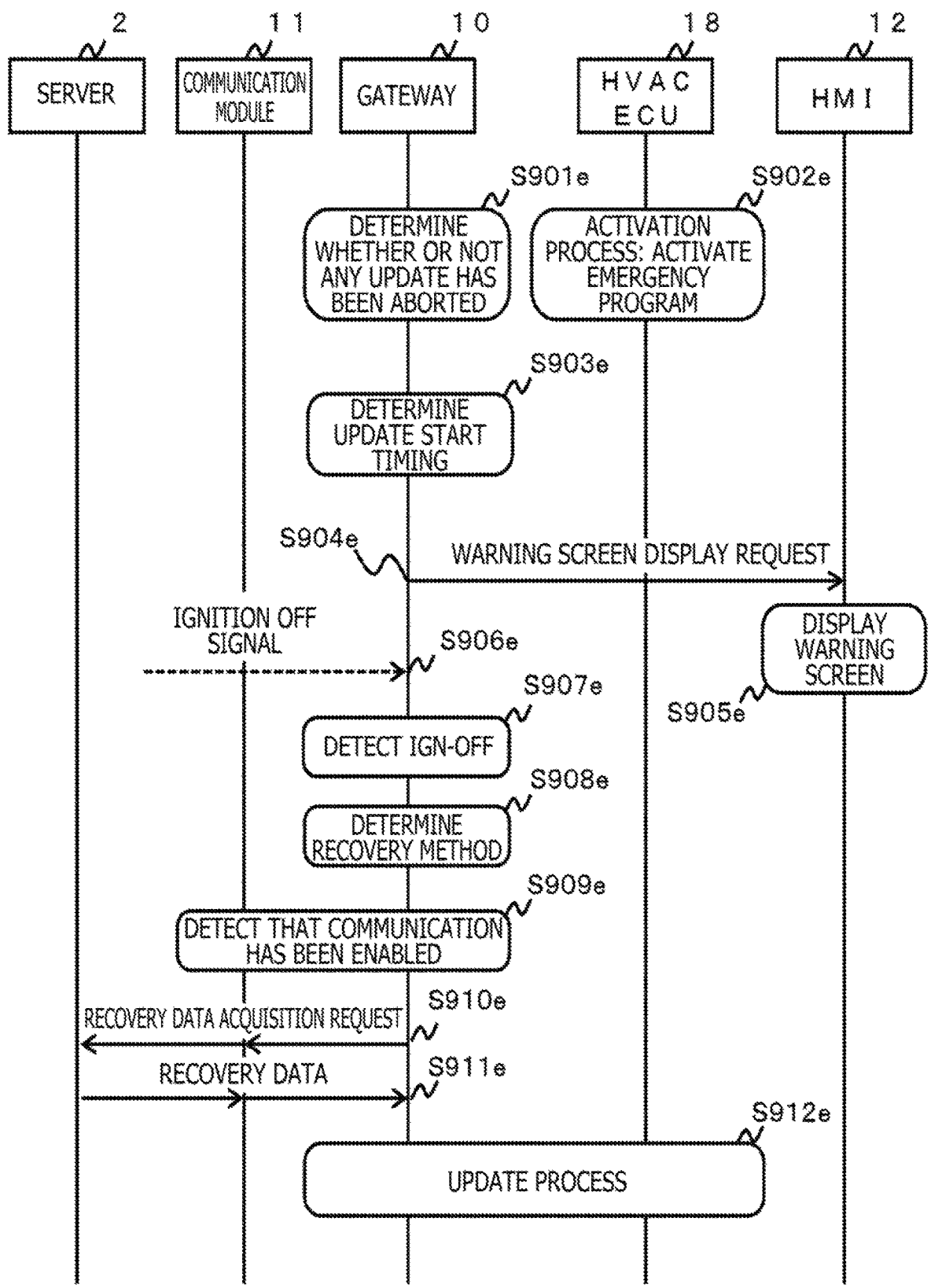
FIG. 22 is a sequence diagram illustrating an example of a recovery process of the HVAC ECU.

FIG. 21 and FIG. 22 will be used to describe a configuration of an update package 5e corresponding to the HVAC ECU 18, an example of display on the HMI 12, and an operation sequence.

FIG. 21(a) is a diagram illustrating a configuration of the update package 5e in a case where only the HVAC ECU 18 is to be updated, FIG. 21(b) is a diagram illustrating a configuration of HVAC ECU recovery control information 5021e included in the update package 5e, and FIG. 21(c) is a diagram illustrating an example of display on the HMI 12 based on the HVAC ECU recovery control information 5021e.

The update package 5e for the case where only the HVAC ECU 18 is to be updated is composed of update control information 501e including the common update control information 5011, HVAC ECU update control information 5012e, and HVAC ECU update data 5013e, and recovery control information 502e including HVAC ECU recovery control information 5021e, as illustrated in FIG. 21(a).

In the HVAC ECU recovery control information 5021e, as illustrated in FIG. 21(b), "HVAC ECU" is set in an ECU ID 50211e, and "IGN-OFF" is set in a start timing 50212e. "Warning" and unillustrated display message information are set in a display content 50213e. "Sever Cooperation" is set in a recovery method 50214e, and "https://example.jp/data," which is a URI where recovery data is stored, is set in a recovery data URI 50215e.

The recovery control unit 10004 causes the display device of the HMI 12 to output screen display G10e illustrated in FIG. 21(c) on the basis of the display content 50213e. The screen display G10e notifies the user that the update of the software has been aborted and that the vehicle 1 is in the function limited state due to the recovery process, and thus an HVAC function is disabled, and the screen display G10e indicates that communication with the server 2 is needed for recovery.

FIG. 22 is a sequence diagram illustrating an example of the recovery process for the HVAC ECU 18. For example, when the update process for the HVAC ECU 18 is aborted by, for example, shutdown of power supply to the gateway 10 and then the power supply is resumed, the recovery process is executed as described below. The HVAC ECU 18 is classified as an ECU including little memory, and can store only one control program as illustrated in FIG. 5(a).

When activated, the gateway 10 starts the process illustrated in FIG. 11. That is, in step S901e, the gateway 10 first checks whether or not any update has been aborted (S701, S702 in FIG. 11, S901e in FIG. 22).

Furthermore, in parallel with the process of the gateway 10, the HVAC ECU 18 executes the activation process illustrated in FIG. 10(a). Here, the update has been aborted, and a part of the current, version 2 control program has been overwritten with a part of the version 3 control program, leading to a problem with verification of the control program P2. The HVAC ECU 18 is thus activated in the emergency mode (S902e).

The gateway 10 determines, from the update start state D102 of the update state D21, that the update of the HVAC ECU 18 has been aborted (S901e), and executes the following process in step S903e. That is, the gateway 10 reads the start timing 50212e from the HVAC ECU recovery control information 5021e corresponding to the HVAC ECU 18 to determine that the recovery process for the HVAC ECU 18 is to be started at the timing of ignition OFF.

Then in step S904e, the gateway 10 reads the display content 50213e from the HVAC ECU recovery control information 5021e to issue, to the HMI 12, a request for display of the warning screen based on the display content 50213e. On the basis of the request, the HMI 12 displays the warning screen illustrated at G10e in FIG. 21(c) (S905e).

The gateway 10 receives the ignition OFF signal (step S906e) to detect the ignition OFF signal (S907e). The gateway 10 then reads the recovery method 50214e from the HVAC ECU recovery control information 5021e to determine the method for the recovery process to be "Server Cooperation" (S908e). As descried above, the recovery based on the "Server Cooperation" method is a method of acquiring, from the server 2 during recovery, data needed to complete or roll back the aborted update. When the communication module 11 detects that communication with the server 2 has been enabled, the gateway 10 receives a corresponding notification from the communication module 11 (S909e). The gateway 10 transmits a recovery data acquisition request to the recovery data URI 50215d of the server 2 via the communication module 11 (step 910e) and receives recovery data (S911e). Moreover, the gateway 10 uses the received recovery data to execute the update process (S912e), thus completing the update of the HVAC ECU 18.

Like the engine control ECU 13 and the brake control ECU 14, the HVAC ECU 18 includes little memory and needs to be updated with a single control program being overwritten. Thus, abortion of the update precludes normal operation of the control program. Accordingly, in a case where the update of the HVAC ECU 18 is aborted, HVAC control is prevented from being performed, but traveling of the vehicle 1 is less affected. The recovery control information 502e is configured as described above and the thus configured recovery control information 502e is used. When the update of the HVAC ECU 18 is aborted, the gateway 10 need not immediately control the HVAC ECU 18 to complete the update. The gateway 10 downloads needed data from the server 2 through server cooperation, and subsequently resumes the update at the next time of ignition OFF. Furthermore, the gateway 10 causes the HMI 12 to display the warning screen to inform the user that abortion of the update has disabled the HVAC function and that resumption of the update needs movement to an environment where communication is enabled and that resumption of the aborted update can be started at the time of ignition OFF.

Furthermore, the gateway 10 can acquire data needed for the recovery process, from the URI described in the recovery data URI 50215. Moreover, in a case where the needed recovery data is acquired from the server to repair the software for the ECU only when an infrequent abnormality occurs, a need to prepare additional memory in the gateway 10 or the ECU is eliminated, the additional memory being used to store recovery data or backup data. This allows the system to be constructed at low cost.

Operation Example—Airbag ECU

Figures 23A, 23B, 23C:
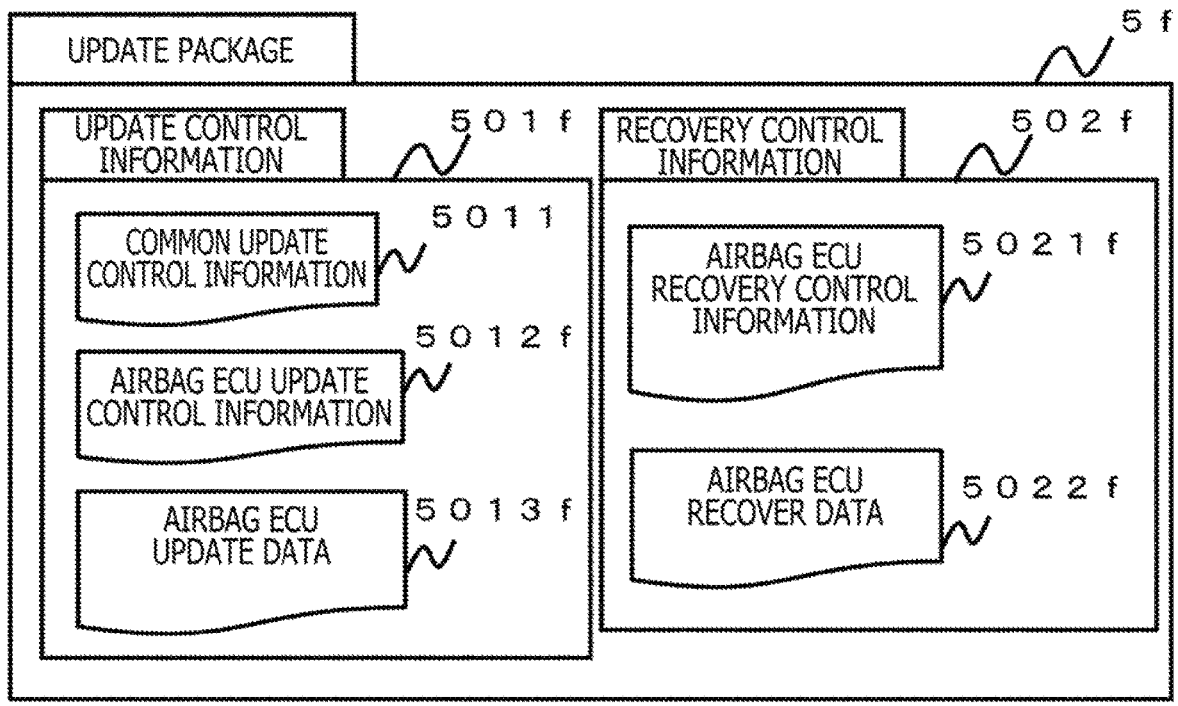
FIG. 23A and FIG. 23B are diagrams illustrating an example of an update package corresponding to an airbag ECU.
FIG. 23C is a diagram illustrating an example of screen display.
Figure 24:
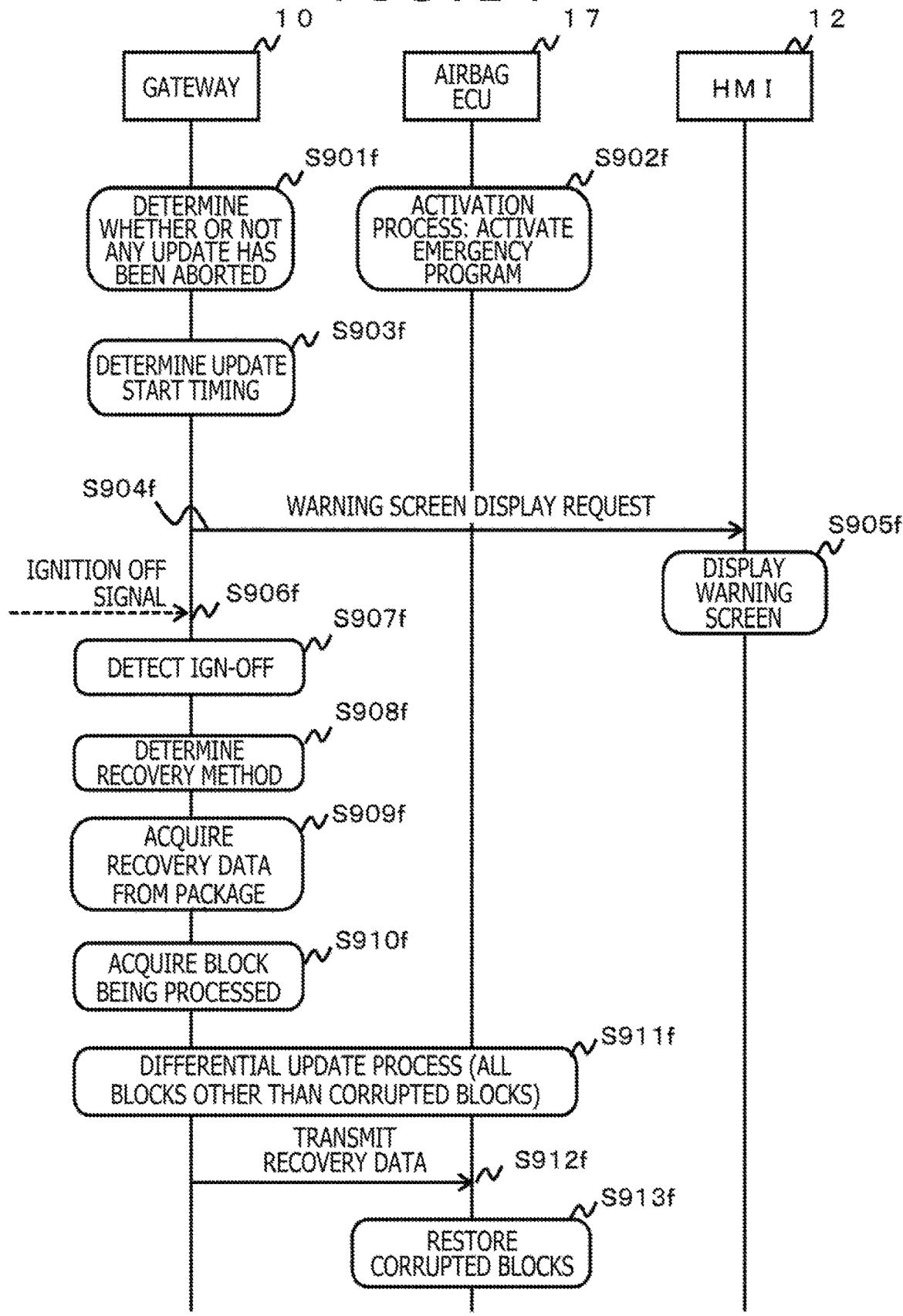
FIG. 24 is a sequence diagram illustrating an example of a recovery process of the airbag ECU.

FIG. 23 and FIG. 24 will be used to describe a configuration of an update package 5f corresponding to the airbag ECU 17, an example of display on the HMI 12, and an operation sequence.

FIG. 23(a) is a diagram illustrating a configuration of the update package 5f in a case where only the airbag ECU 17 is to be updated, FIG. 23(b) is a diagram illustrating a configuration of airbag ECU recovery control information 5021f included in the update package 5f, and FIG. 23(c) is a diagram illustrating an example of display on the HMI 12 based on the airbag ECU recovery control information 5021f.

The update package 5f for the case where only the airbag ECU 17 is to be updated is composed of update control information 501f including the common update control information 5011, airbag ECU update control information 5012f, and airbag ECU update data 5013f, and recovery control information 502f including airbag ECU recovery control information 5021f and airbag ECU recovery data 5022f, as illustrated in FIG. 23(a).

In the airbag ECU recovery control information 5021f, as illustrated in FIG. 23(b), "airbag ECU" is set in an ECU ID 50211f, and "IGN-OFF" is set in a start timing 50212f. "Warning" and unillustrated display message information are set in a display content 50213f. "Block Recovery" is set in a recovery method 50214f, and "NULL" meaning setting of no information is set in a recovery data URI 50215f.

The recovery control unit 10004 causes the display device of the HMI 12 to output screen display G10f illustrated in FIG. 23(c) on the basis of the display content 50213f. The screen display G10f notifies the user that the update of the software has been aborted and that the vehicle 1 is in the function limited state due to the recovery process, and thus the airbag is disabled, and the screen display G10f indicates that the aborted update is to be resumed at the next timing of ignition OFF.

FIG. 24 is a sequence diagram illustrating an example of the recovery process for the airbag ECU 17. For example, when the update process for the airbag ECU 17 is aborted by, for example, shutdown of power supply to the gateway 10 and then the power supply is resumed, the recovery process is executed as described below. The airbag ECU 17 is classified as an ECU including little memory, and can store only one control program as illustrated in FIG. 5(a).

When activated, the gateway 10 starts the process illustrated in FIG. 11. That is, in step S901f, the gateway 10 first checks whether or not any update has been aborted (S701, S702 in FIG. 11, S901f in FIG. 24).

Furthermore, in parallel with the process of the gateway 10, the airbag ECU 17 executes the activation process illustrated in FIG. 10(a). Here, the update has been aborted, and a part of the current, version 2 control program has been overwritten with a part of the version 3 control program, leading to a problem with verification of the control program P2. The airbag ECU 17 is thus activated in the emergency mode (S902f).

The gateway 10 determines, from the update start state D102 of the update state D21, that the update of the airbag ECU 17 has been aborted (S901f), and executes the following process in step S903f. That is, the gateway 10 reads the start timing 50212f from the airbag ECU recovery control information 5021f corresponding to the airbag ECU 17 to determine that the recovery process for the airbag ECU 17 is to be started at the timing of ignition OFF.

Then in step S904f, the gateway 10 reads the display content 50213f from the airbag ECU recovery control information 5021f to issue, to the HMI 12, a request for display of the warning screen based on the display content 50213f. On the basis of the request, the HMI 12 displays the warning screen illustrated at G10f in FIG. 23(c) (S905f). The gateway 10 receives the ignition OFF signal, which is a trigger to start the recovery process (step S906), to detect the ignition OFF signal (S907f). The gateway 10 then reads the recovery method 50214e from the airbag ECU recovery control information 5021f to determine the method for the recovery process to be "Block Recovery" (S908f). The gateway 10 reads the airbag ECU recovery data 5022f packaged in the update package 5f (S909f).

The gateway 10 reads the block being processed D103 from the update state D21 in order to determine, in step S910f, a point where operation is to be started. The gateway 10 determines a block at which the operation is to be started, and then in step 911f, starts executing the software update process S4 in FIG. 8, at the block next to the determined block, completing the update of the airbag ECU 17 in the blocks other than the aborted block. In step S912f, the gateway 10 transmits, to the airbag ECU 17, the recovery data acquired in step S909f. In step S913f, the airbag ECU 17 restores the aborted block (corrupted block) using the received recovery data and the blocks of the updated software other than the aborted block.

The ECUs such as the airbag ECU 17 which include little memory need to be updated with a single control program being overwritten. Thus, abortion of the update precludes normal operation of the control program. Accordingly, in a case where the update of the airbag ECU 17 is aborted, airbag control is prevented from being performed, but traveling of the vehicle 1 is less affected. In a case where the recovery control information 502f is configured as described above and the thus configured recovery control information 502f is used, when the update of the airbag ECU 17 is aborted, the gateway 10 need not immediately control the ECU to complete the update, and resuming the update at the next time of ignition OFF suffices. Furthermore, the gateway 10 causes the HMI 12 to display the warning screen to inform the user that the update has been aborted and that the abortion has disabled an airbag function and that resumption of the aborted update can be started at the time of ignition OFF.

According to the above-described first embodiment, the following advantageous effects are produced.

(1) A software update device, for example, the gateway 10 is connected to a control device and includes the update control unit 10001, for example, the ECU, to execute an update process of causing software for the ECU to transit from a non-updated state to a completely updated state, the recovery control information managing unit 10005 acquiring the recovery control information 502, and the recovery control unit 10004 executing a recovery process of causing the control program to transit to the completely updated state on the basis of the recovery control information 502 in a case where an abnormality in the update process has prevented the control program from transiting to the completely updated state.

The gateway 10 executes the recovery process for the ECU on the basis of the recovery control information 502. The gateway 10 can thus perform various recovery processes on the basis of description of the recovery control information 502, and execute recovery processes corresponding to various devices, for example, various ECUs. In other words, a recovery control process used when an abnormality in update occurs is executed on the basis of the recovery control information 502, allowing the appropriate recovery process to be performed even in a case where an abnormality in update occurs in a system consisting of a large number of ECUs with different resources and characteristics.

(2) The recovery control information 502 includes the start timing 50212 that is information about the timing to start the recovery process. Thus, the gateway 10 can vary the timing to execute recovery on the basis of the recovery control information 502. For example, the recovery can be executed immediately or at the next time of ignition OFF. The setting of the start timing 50212 in the recovery control information 502 is determined according to, for example, a role of the ECU in the vehicle.

(3) In a case where the gateway 10 is installed in the vehicle and the control device is a device controlling at least one of the engine and the brake, the recovery control information includes information indicating that the recovery process is to be started at an immediate timing. Thus, the gateway 10 can immediately start the recovery process on the engine control ECU 13 or the brake control ECU 14, which is essential for traveling of the vehicle.

(4) The recovery control information 502 includes information indicative of the method for the recovery process. Thus, the gateway 10 can appropriately use one of the recovery processes such as differential resume, compression recovery, server cooperation, and block recovery for each ECU on the basis of the recovery control information 502.

(5) The method for the recovery process is determined on the basis of, for example, whether the memory has a large or small capacity. The amount of resources needed for the process is determined by the type of the ECU to some degree. Thus, the configuration of the ECU is associated with the type of the ECU. That is, the method for the recovery process is determined on the basis of the type of the ECU. Thus, the appropriate recovery process can be executed according to the configuration or type of the ECU.

(6) The recovery control information 502 includes the recovery data corresponding to the method for the recovery process. Thus, the gateway 10 can use the recovery data included in the recovery control information 502 to execute the recovery process.

(7) The recovery control information 502 includes the display content 50213 that is information for screen display. The software update device includes a display control unit outputting, to the HMI 12, a signal for displaying, on the basis of the information for screen display, a screen as illustrated in FIG. 13(c), FIG. 15(c), FIG. 17(c), FIG. 19(c), FIG. 21(c), or FIG. 23(c), as a screen notifying the user, an occupant in the vehicle 1, of the function limited state of the vehicle 1 attributed to the recovery process. That is, the software update device includes the recovery control unit 10004.

Thus, the gateway 10 can notify the user how the functions of the vehicle 1 are limited during execution of the recovery process. The gateway 10 informs the user of the situation to allow convenience for the user to be improved.

Modified Example 1

In the above-described embodiment, the gateway 10 plays the role of what is called a software update device updating the control program installed in each ECU. However, the functions of the above-described gateway program 100 may be installed in the communication module 11 or the HMI 12. Moreover, unillustrated another device connected to the in-vehicle network 10a or 10b may include the functions of the gateway program 100.

Modified Example 2

In the above-described first embodiment, access to the recovery data URI 50215 by the gateway 10 leads to acquisition of compressed software. However, a resource identified by the recovery data URI 50215 may be differential data used to roll back from updated software to the current software, XOR data of blocks of software, or data of corrupted blocks. The gateway 10 executes a process compatible with received data.

Modified Example 3

The recovery data URI 50215 included in the recovery control information 502 is set to "NULL" meaning setting of no information in a case where the recovery method 50214 is other than "Server Cooperation." However, in a case where the recovery data is included in the ECU recovery control information 502, "LOCAL" indicating this may be set in the recovery data URI 50215.

Modified Example 4

In the first embodiment, the recovery is defined as transiting of software to the completely updated state in a case where an abnormality in the update process has prevented the software from transiting to the completely updated state. However, the recovery may be defined as transiting of software to the non-updated state in a case where an abnormality in the update process has prevented the software from transiting to the completely updated state. In other words, the recovery may be defined as what is called rollback. In this case, the ECU recovery data 5022 includes information needed to execute rollback, for example, data about XOR among the blocks of the non-updated software, and the recovery control unit 10004 uses the ECU recovery data 5022 to execute the rollback.

Modified Example 5

The gateway 10 may use more network bands than usual when executing the recovery process. For example, for the gateway 10, the number of data transmissions per second or the amount of data transmitted per second is set to have a sufficient margin with respect to loads on the network. The gateway 10 accepts more data transmissions or more data amount than usual when executing the recovery process. This allows the recovery process to be expeditiously executed.

Furthermore, instead of or in addition to using more network bands than usual, the gateway 10 may set a higher priority, than usual, to data frames associated with the recovery process.

The gateway 10 may further use more network bands than usual only under a particular condition instead of using more network bands than usual for all recovery processes. The particular condition is, for example, that the display content 50213 of the ECU recovery control information 5021 is "Emergency" or that an increase in bands is clearly specified in the recovery method 50214.

Modified Example 6

For a combination of the update control procedure included in the ECU update control information 5012 with the recovery method 50214 in the ECU recovery control information 5021, a specific combination may be used. For example, the combination may include differential update as the update control procedure and compression recovery as the recovery method 50214.

Figures 25A, 25B, 25C:
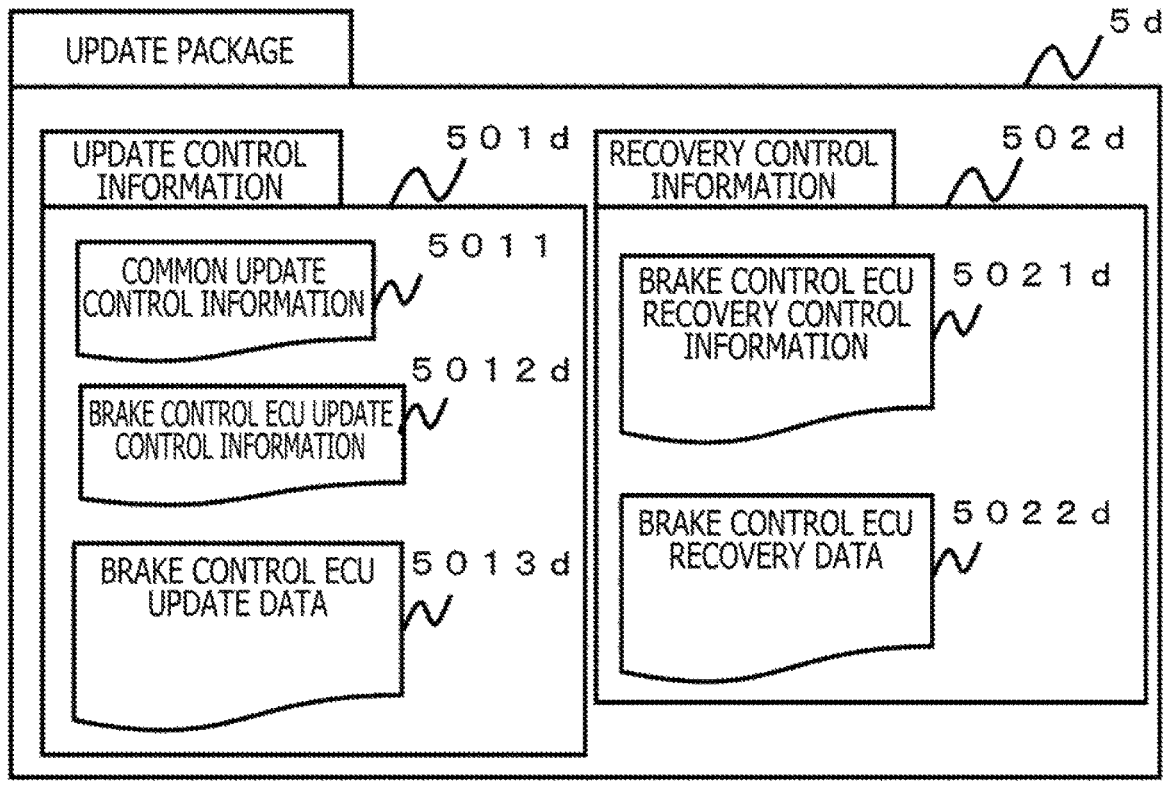
FIGS. 25A to 25C are diagrams illustrating an example of an update package in Modified Example 6.

FIG. 25 is a diagram illustrating a configuration of the update package 5d in a case where only the brake control ECU 14 is to be updated in Modified Example 6. As illustrated in FIG. 25(b), the brake control ECU update control information 5012d is composed of an ECU ID 50121d identifying the ECU, a start timing 50122d indicative of a timing to start update, and an update method 50124d indicative of an update control procedure. Since the update method 50124d is differential update, the brake control ECU update data 5013d is differential data between the latest software and the current software. Since the recovery method 50214d is compression recovery, the brake control ECU recovery data 5022d is compressed latest software.

In this case, the recovery can be reliably achieved by performing differential update which typically completes the process in a short time, and executing write to the entire software in a case where an abnormality occurs in the update. Thus, both swiftness and safety of the process can be achieved in a compatible manner.

The update control procedure may be differential update, the recovery method 50214 may be server cooperation, and the data acquired on the basis of the recovery data URI may be compressed latest-version software.

Furthermore, in a case where the "recovery" is defined as transiting of software to the completely updated state or the non-updated state in a case where an abnormality in the update process has prevented the software from transiting to the completely updated state, the example illustrated in FIG. 25 may be as follows. That is, the brake control ECU update data 5013d may be differential data between the latest software and the current software, and the brake control ECU recovery data 5022d may be compressed current software.

Second Embodiment

A second embodiment of the software update system S will be described with reference to FIG. 26 and FIG. 27. In the description below, the same components of the second embodiment as the corresponding components of the first embodiment are denoted by the same reference signs, and differences from the first embodiment will be focused on. Points not described below are the same as the corresponding points of the first embodiment. The present embodiment differs from the first embodiment mainly in that the recovery control information is stored in the ECU for which the software is to be updated.

(Configuration)

The hardware configuration of the gateway 10 and the configuration of the gateway program 100 in the second embodiment are similar to the corresponding configurations in the first embodiment. However, the operations of the gateway program 100 partly differ as described below.

The hardware configuration of the ECUs in the second embodiment is similar to the hardware configuration of the ECUs in the first embodiment. A configuration of the control program for the ECUs will be described.

Figure 26:
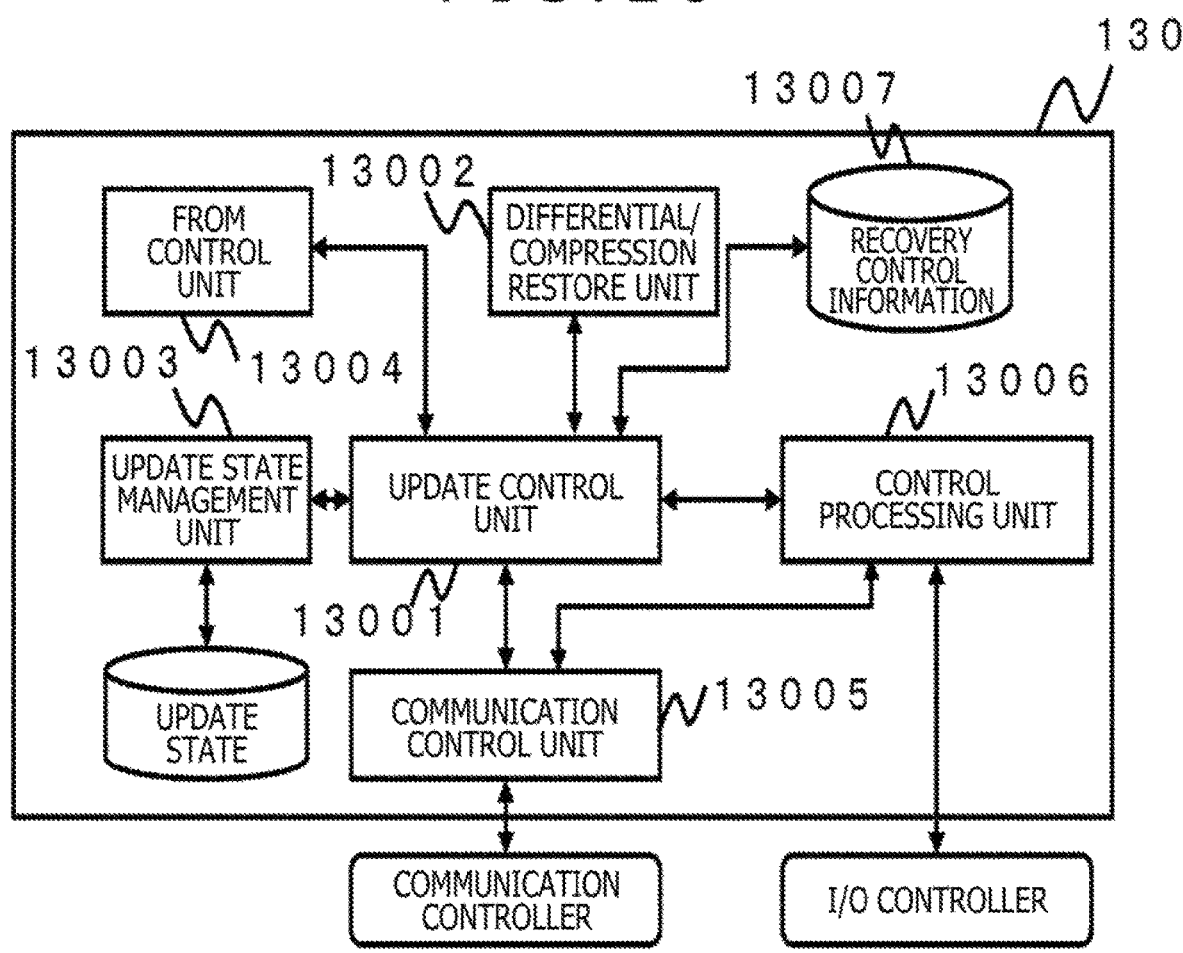
FIG. 26 is a block diagram illustrating a configuration of a control program operating on the engine control ECU in a second embodiment.

FIG. 26 is a block diagram illustrating a configuration of the control program 130 operating on the engine control ECU 13 according to the second embodiment. However, in the present embodiment, for all the ECUs for which the software is to be updated, the control program 130 includes a configuration that is similar at least to the configuration of the control program 130 illustrated in FIG. 26.

The control program 130 in the second embodiment includes not only the components of the first embodiment but also a storage area for recovery control information 13007. The recovery control information 13007 includes information similar to the recovery control information 502 in the first embodiment. However, the recovery control information 13007 contains only information about the ECU for which the recovery control information 13007 is stored, that is, the engine control ECU 13. In other words, the recovery control information 13007 includes one piece of ECU recovery control information and includes up to one ECU recovery data. The recovery control information 13007 may be preset before shipment of the engine control ECU 13 or set after shipment. The components other than the recovery control information 13007 are similar to the corresponding components in the configuration in FIG. 4(b).

(Operation of Acquiring Recovery Control Information)

Figure 27:
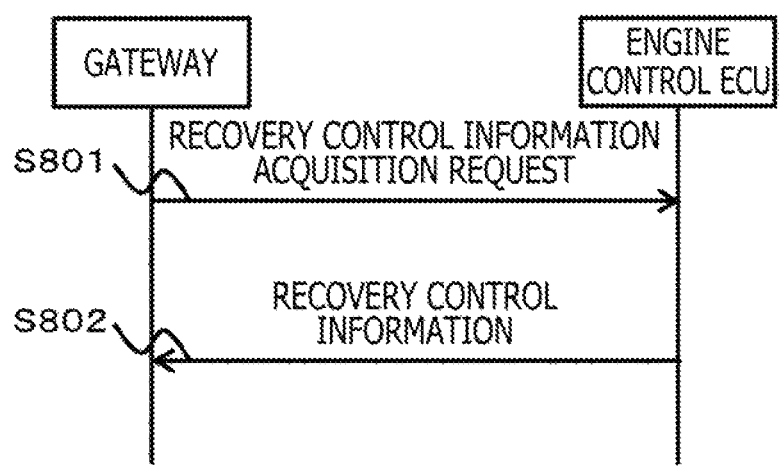
FIG. 27 is a sequence diagram illustrating a process in which the gateway acquires the recovery control information from the engine control ECU.

FIG. 27 is a sequence diagram illustrating a process in which the gateway 10 acquires the recovery control information 13007 from the engine control ECU 13. Before the control software for the engine control ECU 13 is updated, for example, immediately before the update, the gateway 10 acquires the recovery control information 13007 from the engine control ECU 13 as described below.

The update control unit 10001 of the gateway 10 transmits a recovery control information acquisition request to the engine control ECU 13 (S801). The update control unit 13001 of the engine control ECU 13 receives the recovery control information acquisition request, and then reads and transmits the recovery control information 13007 to the gateway 10 (S802). The gateway 10 receives and uses the recovery control information 13007 to execute the recovery process as is the case with the first embodiment.

The above description takes the engine control ECU 13 as an example. However, a similar configuration and a similar sequence can be used to perform the operation for the other ECUs.

According to the above-described second embodiment, the following advantageous effects are produced.

(1) The ECU includes the storage area for the recovery control information 13007 that is information used for the recovery process for the ECU, and provides the recovery control information 13007 in accordance with a request made by the gateway 10.

The gateway 10 can thus execute the recovery process by acquiring the information regarding the recovery process for each ECU, from the ECU present physically close to the gateway 10 rather than from the server 2 connected to the gateway 10 via the Internet 3. Furthermore, in a case where addition, replacement, or the like of an ECU leads to a mismatch between the actual configuration of the vehicle and the configuration of the vehicle managed by the server 2, the appropriate recovery control information is prevented from being acquired from the server. However, recovery control can be appropriately achieved even in a case of a mismatch between the configuration of the vehicle system in the server 2 and the actual configuration of the vehicle system.

Third Embodiment

A third embodiment of the software update system S will be described with reference to FIG. 28 to FIG. 30. In the description below, the same components of the third embodiment as the corresponding components of the first embodiment are denoted by the same reference signs, and differences from the first embodiment will be focused on. Points not described below are the same as the corresponding points of the first embodiment. The present embodiment differs from the first embodiment mainly in that the recovery control information is stored for each cause of abortion. Furthermore, the "recovery" in the present embodiment includes an operation performed in a case where an abnormality in the update process has prevented the software from transiting to the completely updated state and where a critical abnormality has disabled transiting of the software to the completely updated state; the operation includes notifying the user of this situation. The user recognizes through the notification that the critical abnormality has occurred in the vehicle, and can take necessary measures, for example, make contact with the dealer.

(Configuration)

The hardware configuration of the gateway 10 and the configuration of the gateway program 100 in the third embodiment are similar to the corresponding configurations in the first embodiment. However, the operations of the gateway program 100 partly differ as described below.

The hardware configuration of the ECUs in the third embodiment is similar to the hardware configuration of the ECUs in the first embodiment.

Figure 28A:
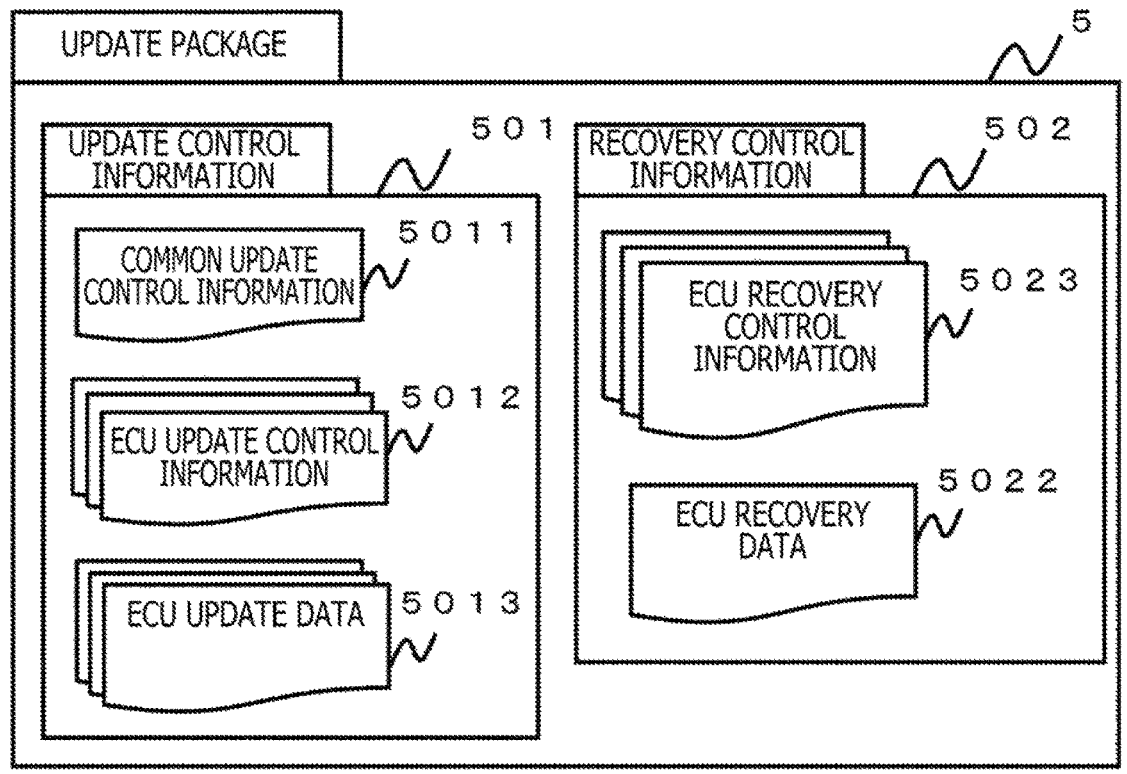
FIG. 28A is a diagram illustrating a configuration of an update package in a third embodiment.

FIG. 28(a) illustrates a configuration example of the update package 5 in the third embodiment. As illustrated in FIG. 28(a), the configuration of the update package 5 in the third embodiment is similar to the configuration of the update package 5 in the first embodiment except for the use of reference sign 5023 for the ECU recovery control information and for the configuration of the ECU recovery control information 5023 as described below.

Figure 28B:
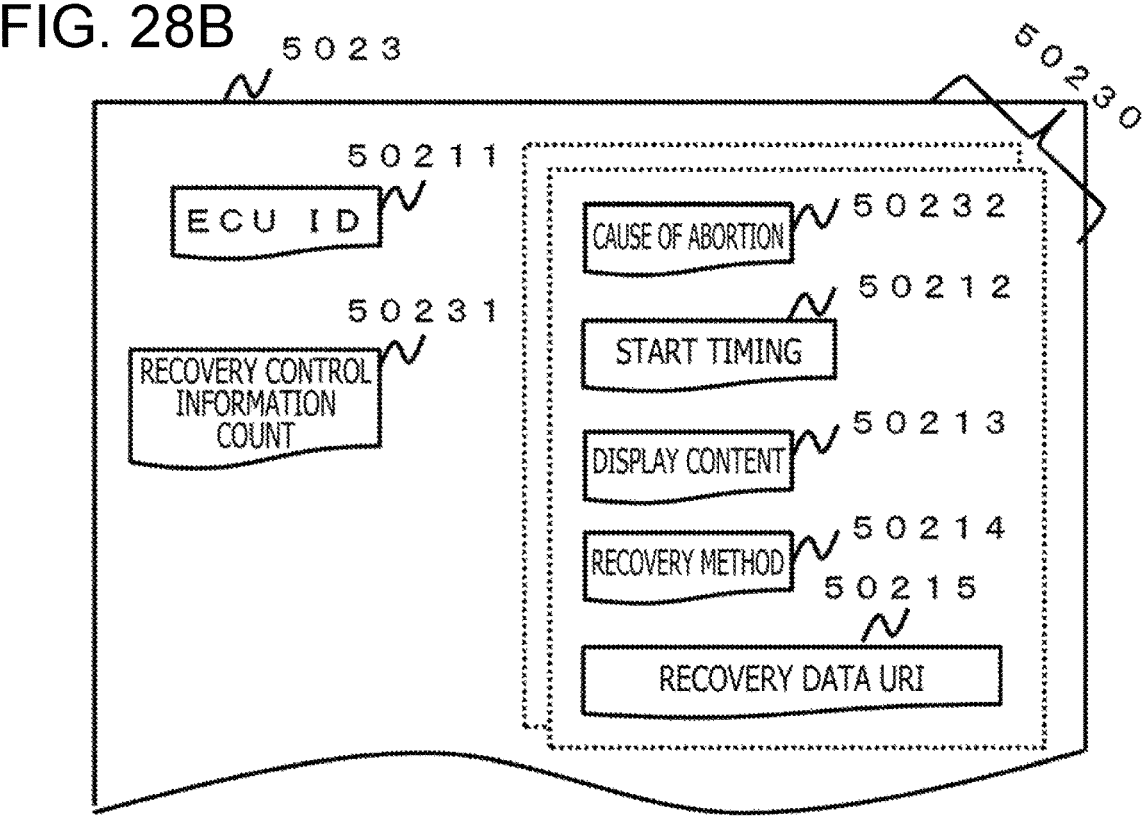
FIG. 28B is a diagram illustrating a configuration of ECU recovery control information in the third embodiment.

FIG. 28(b) is a diagram illustrating the configuration of the ECU recovery control information 5023 in the third embodiment. In addition to the configuration of the ECU recovery control information 5021 in the first embodiment, the ECU recovery control information 5023 further includes one recovery control information count 50231 and one or more causes of abortion 50232. The ECU recovery control information 5023 includes the start timing 50212, the display content 50213, the recovery method 50214, and the recovery data URI 50215 that correspond to each of the causes of abortion 50232. The recovery control information count 50231 indicates how many causes of abortion 50232 are included in the ECU recovery control information 5023. The cause of abortion 50232 is indicative of a cause of abortion of update. In the description below, a cause-by-cause recovery control information 50230 refers to a combination of the cause of abortion 50232, the start timing 50212, the display content 50213, the recovery method 50214, and the recovery data URI 50215.

Operation Example

Figure 30A:
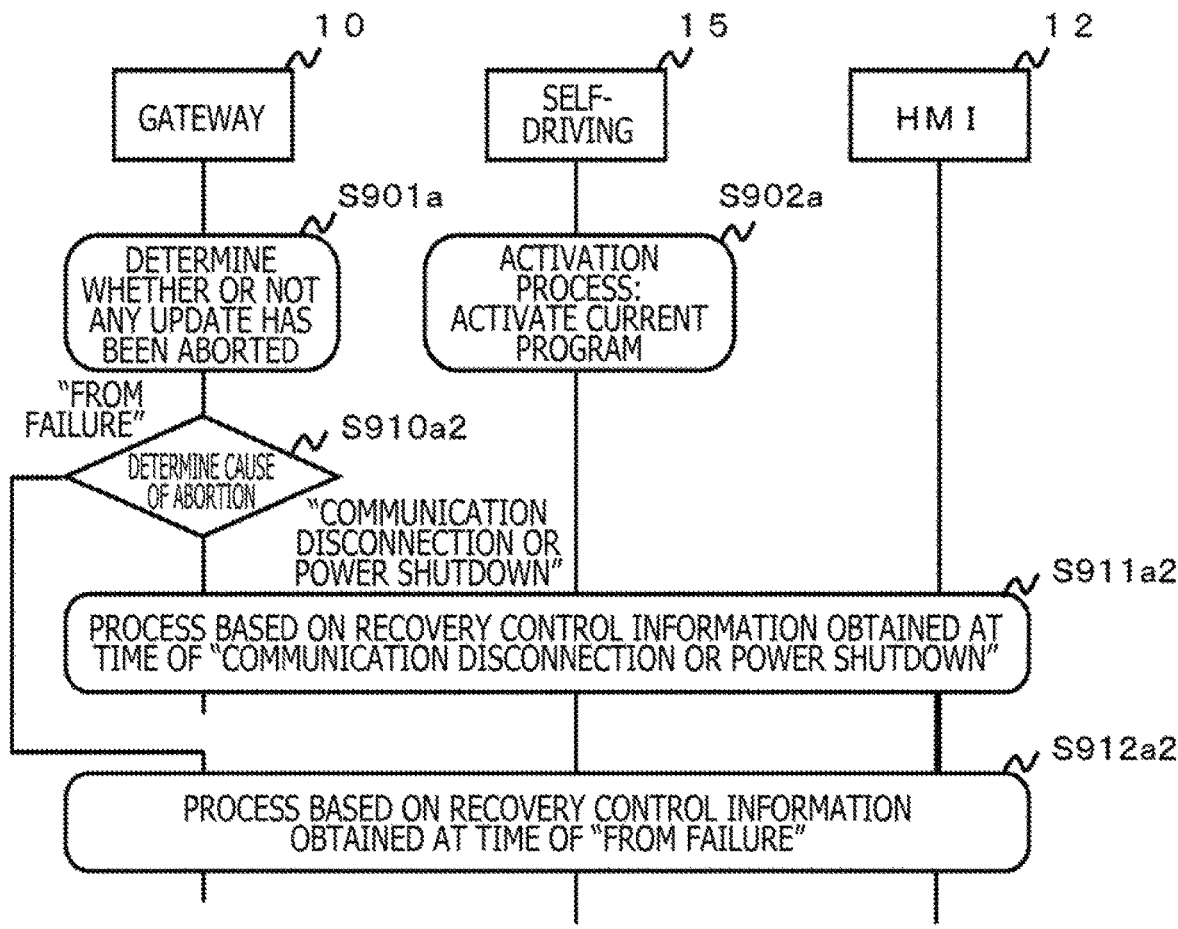
FIG. 30A is a sequence diagram illustrating an example of a recovery control process varying according to a cause of abortion.

FIG. 29 and FIG. 30 are used to illustrate a configuration example of recovery control information 5023a, an example of display on the HMI 12, a configuration example of an update state D1a, and an operation sequence in a case where the recovery control to be executed varies according to the cause of abortion.

The recovery control information 5023a in the third embodiment is composed of the ECU ID 50211a, a recovery control information count 50231a, and a cause-by-cause recovery control information 50230a, as illustrated in FIG. 29(a). "Self-Driving ECU" is set in the ECU ID 50211a. "2" is set in the recovery control information count 50231. "Power Shutdown or Communication Disconnection" is set in a first cause of abortion 50232a. "Traveling Start" is set in the start timing 50212a. "Attention Calling" and unillustrated display message information are set in the display content 50213a. "Differential Resume" is set in the recovery method 50214a. "NULL" meaning that no information is set is set in the recovery data URI 50215a. "Immediate" is set in a second cause of abortion 50232a2. "Immediate" is set in a start timing 50212a2. "Emergency" and unillustrated display message information are set in a display content 50213a2, the display message information urging guidance to the dealer. "NULL" meaning that no information is set is set in a recovery method 50214a2. "NULL" meaning that no information is set is set in a recovery data URI 50215a2.

The recovery control unit 10004 causes, on the basis of the display content 50213a2, the display device of the HMI 12 to output screen display G10a2 illustrated in FIG. 29(b). The screen display G10a2 is display indicating that the update of the software has been aborted by a critical error and that recovering the update needs making contact with the dealer.

In addition to the information about the update state D1 in the first embodiment, the update state D1a in the third embodiment includes a cause of abortion D106 as illustrated in FIG. 29(c). The cause of abortion D106 is a field in which a cause of abortion of update is stored, for example, "Power Shutdown," "Communication Disconnection," "FROM Failure," or the like is stored.

A record D11a is a record indicative of the update state of the self-driving ECU 15 in the third embodiment. "FROM Failure" is stored in the field of cause of abortion D106. Recording the cause of abortion D106 in this manner allows the cause of abortion of the update to be recognized, enabling the appropriate recovery process to be started.

FIG. 30 is a sequence diagram illustrating an example of the recovery process for the self-driving ECU 15 in the third embodiment. For example, when the ignition is turned on again after resumption of power supply to the gateway 10 following abortion of the update process for the self-driving ECU 15 due to shutdown of the power supply or after the update process is aborted by a failure in the FROM of the self-driving ECU 15, the recovery process is executed as described below.

The gateway 10 is activated and first checks in step S901a whether or not any update has been aborted (S701, S702 in FIG. 11, S901a in FIG. 30).

Furthermore, in parallel with the process of the gateway 10, the self-driving ECU 15 executes the activation process illustrated in FIG. 10(b). Here, the update has been aborted, the activation information D33 has not been rewritten yet, and activation of the control program recorded in the program area 1313bP0 is specified. Thus, the self-driving ECU 15 activates the current, version 2 control program P4.

The gateway 10 determines, from the update start state D102 of the update state D21, that the update of the self-driving ECU 15 has been aborted (S901a), and executes the following process in step S910a2. That is, the gateway 10 reads, from the update state D1a, the cause of abortion D106 corresponding to the self-driving ECU 15 to determine the cause of abortion. In a case where the cause of abortion is "Power Shutdown or Communication Disconnection" (S901a2: "Power Shutdown or Communication Disconnection"), then in step S911a2, the gateway reads, from the self-driving ECU recovery control information 5023a, the recovery control information with the cause of abortion "Power Shutdown or Communication Disconnection," and executes the recovery process based on the recovery control information. The process from step S903a to step S909a in FIG. 14 is the same as the recovery process based on the recovery control information with the cause of abortion "Power Shutdown or Communication Disconnection." In a case where the cause of abortion is "FROM Failure" (S901a2: "FROM Failure"), then in step S912a2, the gateway 10 reads, from the self-driving ECU recovery control information 5023a, the recovery control information with the cause of abortion "FROM Failure," and executes the recovery process based on the recovery control information.

Figure 30B:
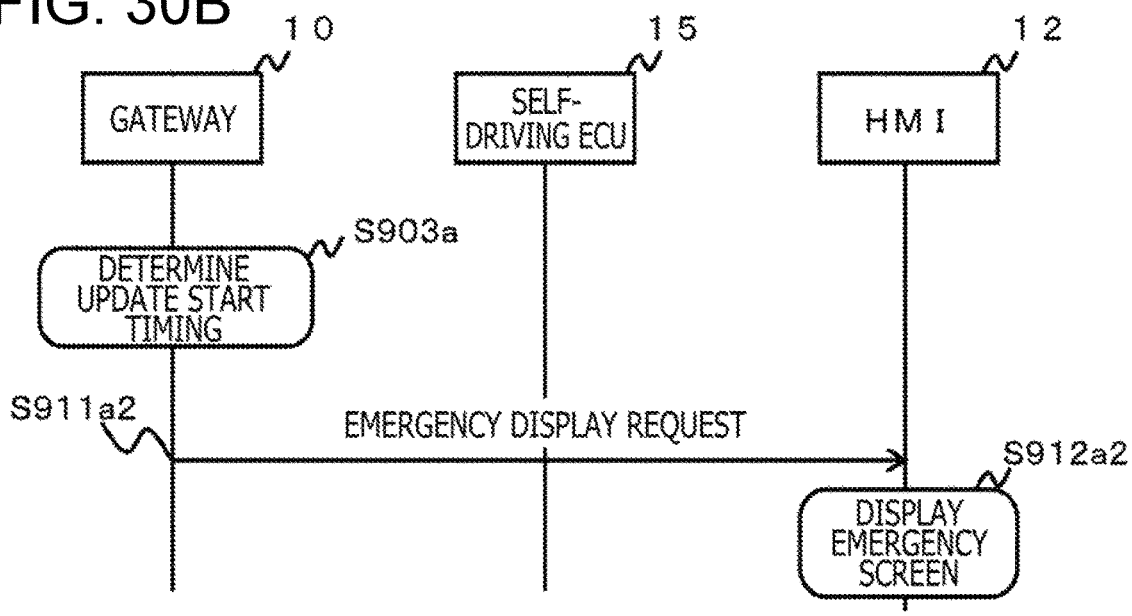
FIG. 30B is a sequence diagram illustrating an example of the recovery control process executed at the time of an FROM failure.

The recovery process based on the recovery control information with the cause of abortion "FROM Failure" is executed in accordance with a procedure illustrated in FIG. 30(b). That is, the gateway 10 reads the start timing 50212a2 for a case where the cause of abortion is "FROM Failure," from the self-driving ECU recovery control information 5023 corresponding to the self-driving ECU 15, to determine that the recovery process for the self-driving ECU 15 is to be started at an immediate timing. Then in step S903a2, the gateway 10 reads, from the self-driving ECU recovery control information 5023, the display content 50213a2 for the case where the cause of abortion is "FROM Failure," and issues, to the HMI 12, a request for display of the emergency screen based on the display content 50213a2 (S911a2). On the basis of the request, the HMI 12 displays, on the display device, the emergency screen illustrated at G10a2 in FIG. 29(b) (S912a2).

According to the above-described third embodiment, the following advantageous effects are produced.

(1) The recovery control information 5023 includes the recovery control information for each cause of abnormality, and the gateway 10 selects the recovery process to be applied, according to the cause of abnormality.

For example, in a case where the cause of abortion of update is a failure in the FROM, replacement of the hardware or the like is needed, and the system has difficulty in independently making a recovery. Thus, an applicable recovery process may vary according to the cause of abortion. In a case where the recovery control information 5023 is configured as described above and the thus configured recovery control information 5023 is used, the recovery process to be executed can be varied depending on whether or not a critical abnormality occurs in the ECU, and appropriate information can be communicated to the user.

The present invention is not limited to the above-described embodiments but includes various modified examples. For example, the above-described embodiments have been described in detail to facilitate understanding, and are not necessarily limited to the configuration with all of the described components. Furthermore, a part of the configuration of one embodiment can be replaced with the configuration of another embodiment, and to the configuration of one embodiment, the configuration of another embodiment can be added. Furthermore, on a part of the configuration of each embodiment, addition, removal, or replacement of another configuration can be performed, and the order of the processes can be changed. For example, in the present embodiment, the software update device is the gateway 10. However, the software update device may be the communication module 11 or the HMI 12.

Furthermore, each of the configurations, functions, processing units, processing means, and the like may be partly or wholly implemented in hardware by, for example, being designed as an integrated circuit. Furthermore, each of the configurations, functions, and the like may be realized in software that implements the function and that is interpreted and executed by a processor.

Furthermore, illustrated control lines and information lines are considered to be necessary, and not all the control lies or information lines on the product are illustrated. It may be contemplated that substantially all of the components are actually connected together.

Various embodiments and modified examples have been described. However, the present invention is not limited to these contents. Other possible aspects within the range of technical ideas of the present invention are also included within the scope of the present invention.

The disclosed contents of the following basic application claiming a priority are incorporated herein by reference.

Japanese Patent Application No. 2016-202767 (filed on Oct. 14, 2016)

REFERENCE SIGNS LIST

S: Software update system

1: Vehicle

2: Server

10: Gateway

13: Engine control ECU

14: Brake control ECU

10001: Update control unit

10004: Recovery control unit

10005: Recovery control information managing unit

502: ECU recovery control information

5021: ECU recovery control information

5022: ECU recovery data

50212: Recovery start timing

50212: Start timing

50213: Display content

50214: Recovery method

The invention claimed is:

1. A software update device connected to a control device, which includes memory which is nonvolatile memory, comprising:
   an update control unit executing an update process of causing software which is stored in the memory for the control device to transit from a non-updated state to a completely updated state;
   a recovery control information managing unit acquiring recovery control information; and
   a recovery control unit executing a recovery process of causing the software to transit to the completely updated state on a basis of the recovery control information in a case where an abnormality in the update process has prevented the software from transiting to the completely updated state, wherein
   the recovery control information includes information indicative of a method for the recovery process; and
   the information indicative of the method for the recovery process is determined on a basis of a configuration of the control device, wherein
   the configuration of the control device is a configuration of the memory, and
   the recovery control information includes Electronic Control Unit (ECU) recovery control information and the ECU recovery control information includes an ECU ID which identifies the ECU, a start timing indicative of a timing to start recovery, a display content indicative of a content displayed on a screen of a display device, a recovery method, and a recovery data which is configured to acquire additional recovery data.

2. The software update device according to claim 1, wherein the recovery control information includes information about a timing to start the recovery process.

3. The software update device according to claim 2, wherein the software update device is installed in a vehicle, and the recovery control information includes information indicating that the recovery process is to be started at an immediate timing in a case where the control device is a device controlling at least one of an engine and a brake.

4. The software update device according to claim 1, wherein the recovery control information includes recovery data corresponding to the method for the recovery process.

5. The software update device according to claim 1, wherein the software update device is connected to a display device installed in a vehicle and providing screen display, the recovery control information includes information for the screen display, and the software update device further comprises a display control unit outputting, to the display device, a signal for displaying a screen on a basis of the information for the screen display, the screen notifying an occupant in the vehicle of a function limited state of the vehicle due to the recovery process.

6. The software update device according to claim 1, wherein the recovery process includes data about XOR among blocks in the non-updated state, and the recovery control information managing unit uses the recovery process to execute a rollback.

7. The software update device according to claim 1, wherein the acquiring recovery control information includes acquiring the recovery control information from a target ECU.

8. The software update device according to claim 1, wherein the recovery control information includes recovery control information for each cause of abnormality.

9. A software update method executed by a software update device connected to a control device, which is stored in the memory, the software update method comprising:
   executing an update process of causing software which includes memory which is nonvolatile memory, for the control device to transit from a non-updated state to a completely updated state;
   acquiring recovery control information which includes Electronic Control Unit (ECU) recovery control information; and
   executing a recovery process of causing the software to transit to the completely updated state on a basis of the recovery control information in a case where an abnormality in the update process has prevented the software from transiting to the completely updated state, wherein
   the recovery control information includes information indicative of a method for the recovery process,
   the information indicative of the method for the recovery process is determined on a basis of a configuration of the control device,
   the configuration of the control device is a configuration of the memory, and
   the recovery control information includes ECU recovery control information and the ECU recovery control information includes an ECU ID which identifies the ECU, a start timing indicative of a timing to start recovery, a display content indicative of a content displayed on a screen of a display device, a recovery method, and a recovery data which is configured to acquire additional recovery data.

10. The software update method according to claim 9, wherein the recovery control information includes information about a timing to start the recovery process.

11. The software update method according to claim 10, wherein the software update device is installed in a vehicle, and the recovery control information includes information indicating that the recovery process is to be started at an immediate timing in a case where the control device is a device controlling at least one of an engine and a brake.

12. The software update method according to claim 9, wherein the recovery control information includes recovery data corresponding to the method for the recovery process.

13. The software update method according to claim 9, wherein the software update device is connected to a display device installed in a vehicle and providing screen display, the recovery control information includes information for the screen display, and the software update method further comprises: outputting, to the display device, a signal for displaying a screen on a basis of the information for the screen display, the screen notifying an occupant in the vehicle of a function limited state of the vehicle due to the recovery process.

14. The software update method according to claim 9, wherein the recovery process includes data about XOR among blocks in the non-updated state, and the recovery control information managing unit uses the recovery process to execute a rollback.

15. The software update method according to claim 9, wherein the acquiring recovery control information includes acquiring the recovery control information from a target ECU.

16. The software update method according to claim 9, wherein the recovery control information includes recovery control information for each cause of abnormality.

17. A software update system comprising: the software update device according to claim 1; and a server transmitting the recovery control information to the software update device.

* * * * *